United States Patent [19]
Shimizume et al.

[11] Patent Number: 5,883,866
[45] Date of Patent: Mar. 16, 1999

[54] DISK DRIVING SYSTEM AND DISK DRIVING METHOD

[75] Inventors: Kazutoshi Shimizume; Mamoru Akita, both of Kanagawa, Japan

[73] Assignee: Sony Corporation, Japan

[21] Appl. No.: 905,343

[22] Filed: Aug. 4, 1997

[30] Foreign Application Priority Data

Aug. 14, 1996 [JP] Japan .................................... 8-214589

[51] Int. Cl.$^6$ ..................................................... G11B 7/00
[52] U.S. Cl. ................................ 369/50; 369/58; 369/59
[58] Field of Search ............................... 369/50, 47, 48, 369/49, 54, 58, 59, 32, 275.3

[56] References Cited

U.S. PATENT DOCUMENTS

| | | | |
|---|---|---|---|
| 4,558,375 | 12/1985 | Sontheimer | 369/50 X |
| 5,153,869 | 10/1992 | Yoshimaru et al. | 369/50 X |
| 5,757,750 | 5/1998 | Uemura | 369/50 |

*Primary Examiner*—Muhammad N. Eduh
*Attorney, Agent, or Firm*—Ronald P. Kananen

[57] ABSTRACT

In a disk recording/reproduction apparatus, the operational limit of each of a mechanical apparatus and signal processing of a disk drive is taken into consideration. When an area from the innermost region of a disk to a predetermined distance is recorded or reproduced, the disk is rotationally driven by a CAV method, and when an area from the predetermined distance of the disk to the outermost region is recorded or reproduced, the disk is rotationally driven by a CLV method.

14 Claims, 14 Drawing Sheets

DISK DRIVING SYSTEM AND DISK DRIVING METHOD

BACKGROUND OF THE INVENTION

1. Field of the Invention

The present invention relates to a disk driving apparatus and a disk driving method. More particularly, the present invention relates to a disk apparatus and a disk driving method, which are capable of causing disk-shaped recording media, such as audio CDs (Compact Disks) CD-ROMs (Read Only Memories), video CDs, and DVDs (Digital Versatile Disks), to be efficiently driven rotationally.

2. Description of the Related Art

As methods for rotationally rotating disk-shaped recording media (hereinafter appropriately referred to simply as "disks"), such as CD-ROMs when they are reproduced, a constant angular velocity (CAV) method and a constant linear velocity (CLV) method are known. In the CAV or CLV method, a disk is rotationally driven at a fixed rotational velocity (number of rotations) or linear velocity, respectively, from its innermost region to its outermost region.

Meanwhile, in disk drives for reproducing, for example, a CD-ROM, a disk is rotationally driven by the CLV method so as to read data always at a fixed data rate. Therefore, the rotational velocity of the disk becomes faster the further inward the region being reproduced (accessed) is located, and in a CD-ROM or the like, the rotational velocity in its innermost region becomes approximately 2.5 times as high as that in the outermost region.

That is, when, for example, an 8× speed reproduction of a CD-ROM is performed, its rotational velocity is approximately 4,000 rpm (revolutions per minute) in the innermost region in comparison with 1,600 rpm in the outermost region.

At present, there has been realized an 8× speed reproduction disk drive having a mechanical system capable of stably rotating a CD-ROM at approximately 4,000 rpm or less. However, as described above, a CD-ROM is rotationally rotated at approximately 4000 rpm or less only in the innermost region thereof, and its rotational velocity decreases the further toward the outermost region the reproduction position is located.

Therefore, in this case, the maximum performance of the mechanical system can be exhibited only when the innermost region is reproduced, and in the outermost region, the performance is not effectively utilized.

Accordingly, there is a method of rotationally rotating the outermost region at approximately 4,000 rpm. In this method, the rotational velocity in the innermost region becomes approximately 10,000 rpm, which exceeds the limit of the mechanical system. Further, if the disk is rotated at a rotational velocity exceeding the limit of the mechanical system, vibrations of the disk drive, resulting from decentering or an eccentric center of gravity of the disk, become strong, and it becomes difficult to stably read data. Therefore, there occurs a need to strengthen the mechanical system, resulting in a high-cost of the apparatus and a complex design.

Further, since, as described above, the CD-ROM is reproduced by a CLV method in which the linear velocity is fixed, i.e., the rotational velocity differs according to the reproduction position (radius), problems arise in that when data is read by performing a long-distance traverse from the innermost region to the outermost region, it takes time.

More specifically, when a traverse is performed, it is necessary to change the rotational velocity of the CD-ROM from a value appropriate for a position before a traverse to a value appropriate for a position after the traverse (for example, when a traverse from the innermost region to the outermost region is performed, it is necessary to decrease the rotational velocity from approximately 4,000 rpm to approximately 1,600 rpm). Therefore, after the traverse, the reading of data cannot be started until the time required for the traverse has elapsed. This fact is a factor for causing the seek time to deteriorate.

Accordingly, there is a method in which a mechanical system for rotationally rotating a CD-ROM having a large torque capable of performing rapid acceleration and deceleration is used. When such a mechanical system is used, the apparatus becomes enlarged and the cost thereof is increased, and when rapid acceleration and deceleration is performed, consumption of power increases.

OBJECT AND SUMMARY OF THE INVENTION

The present invention aims to be capable of rotationally rotating a disk efficiently.

The disk driving apparatus in accordance with the present invention comprises control means for controlling driving means so that a recording medium is rotationally driven by a first or second driving method while access means is accessing a first or second area of a recording medium, respectively.

The disk driving method in accordance with the present invention rotationally drives a recording medium by a first or second driving method while access to a first or second area of the recording medium is being performed, respectively.

In the disk driving apparatus in accordance with the present invention, control means controls driving means so that when the access means is accessing a first or second region of the recording medium, the recording medium is rotationally driven by a first or second drive method, respectively.

In the disk driving method in accordance with the present invention, when access to a first or second area of a recording medium is being performed, the recording medium is rotationally rotated by a first or second drive method, respectively.

The above and further objects, aspects and novel features of the invention will become more apparent from the following detailed description when read in connection with the accompanying drawings.

DETAILED DESCRIPTION OF THE PREFERRED EMBODIMENTS

The preferred embodiments of the present invention will be described below. First, however, in order to make clear the corresponding relationship between each means of the claims of the present invention and the following embodiments, the features of the present invention will be described below with corresponding examples (however, only one example) added to the parentheses after each means.

A disk driving apparatus in accordance with the present invention is a disk driving apparatus for rotationally driving a disk-shaped recording medium, and comprises driving means (e.g., a spindle motor 2 shown in FIG. 7) for rotationally driving a recording medium, access means (e.g., a pick-up 3 shown in FIG. 7) for accessing a recording medium, and control means (e.g., a microcomputer 20 shown in FIG. 7) for controlling the driving means so that a recording medium is rotationally driven by a first or a second driving method while the access means is accessing a first and a second area of the recording medium, respectively.

Also, the disk driving apparatus in accordance with the present invention further comprises linear velocity detection means (e.g., a velocity detector 32 shown in FIG. 7) for detecting the linear velocity at the position of a recording medium that the access means is accessing, wherein the control means recognizes the position at which the access means is accessing a recording medium on the basis of a linear velocity detected by the linear velocity detection means.

Figure 7:
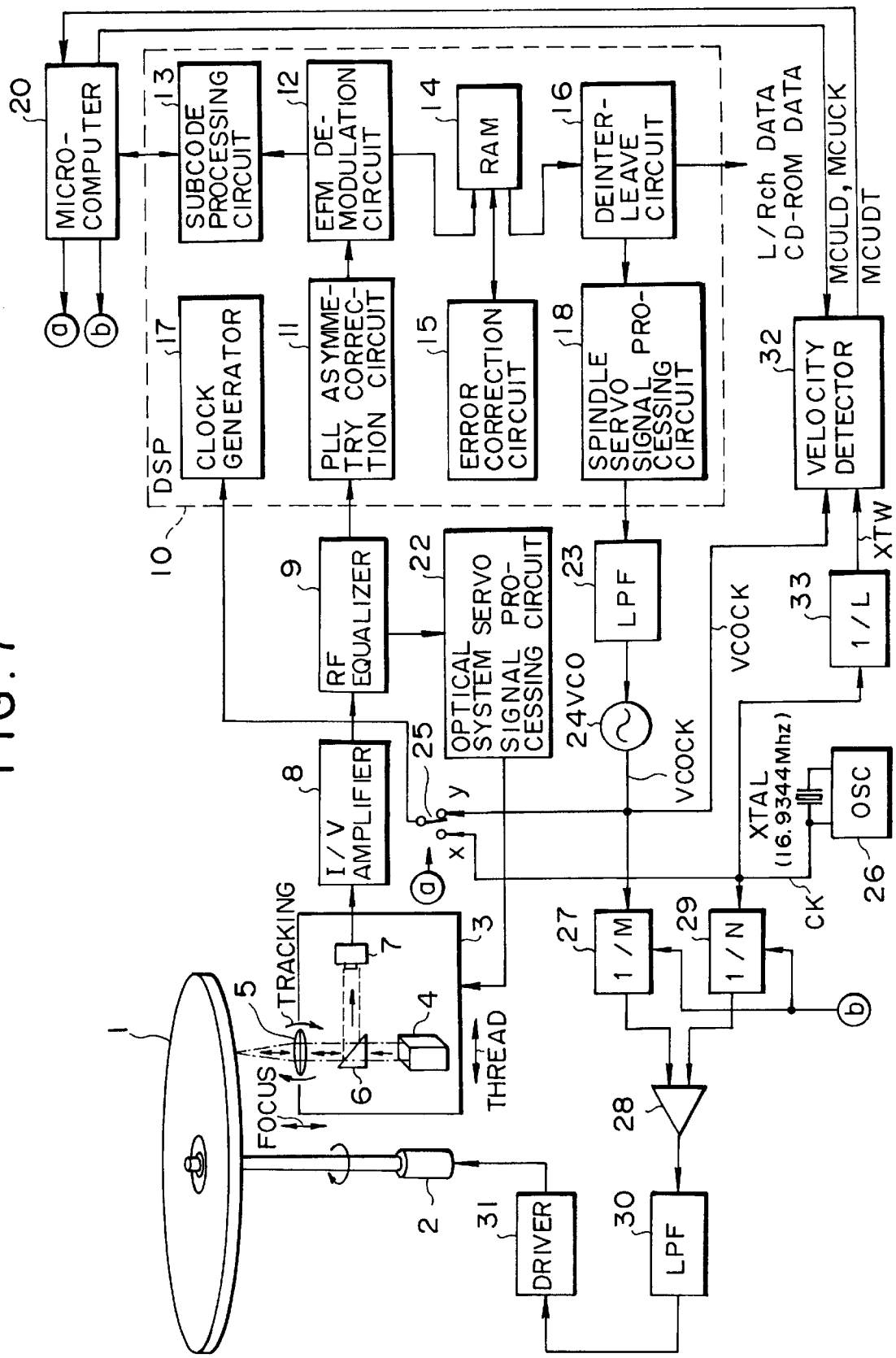
FIG. 7 is a block diagram illustrating in more detail an example of the construction of the disk drive in FIG. 6.

Also, the disk driving apparatus in accordance with the present invention further comprises fixed-clock generation means (e.g., an OSC (OSCillator) shown in FIG. 7) for generating a fixed clock which is a clock of a fixed frequency, variable-clock generation means (e.g., a voltage-controlled oscillator (VCO) 24 shown in FIG. 7) for generating a clock of a variable frequency, error detection means (e.g., a spindle servo signal processing circuit 18 shown in FIG. 7) for detecting an error of the linear velocity at the position at which the access means is accessing the recording medium with respect to the variable clock, fixed-clock frequency-dividing means (e.g., a frequency divider 29 shown in FIG. 7) for frequency-dividing a fixed clock, and variable-clock frequency-dividing means (e.g., a frequency divider 27 shown in FIG. 7) for frequency-dividing a variable clock, wherein the variable-clock generation means generates a variable clock of a frequency corresponding to an error output from the error detection means, the driving means rotationally drives a recording medium on the basis of the difference between the outputs of the fixed-clock frequency-dividing means and the variable-clock frequency-dividing means, and the control means causes the driving means to rotationally drive a recording medium by a first or second driving method by setting the frequency-dividing ratios of the fixed-clock frequency-dividing means and the variable-clock frequency-dividing means.

It is a matter of course that this description does not mean that each means is limited to the above examples.

Next, a description will be given of a method of driving a disk in accordance with the present invention.

Figure 1:
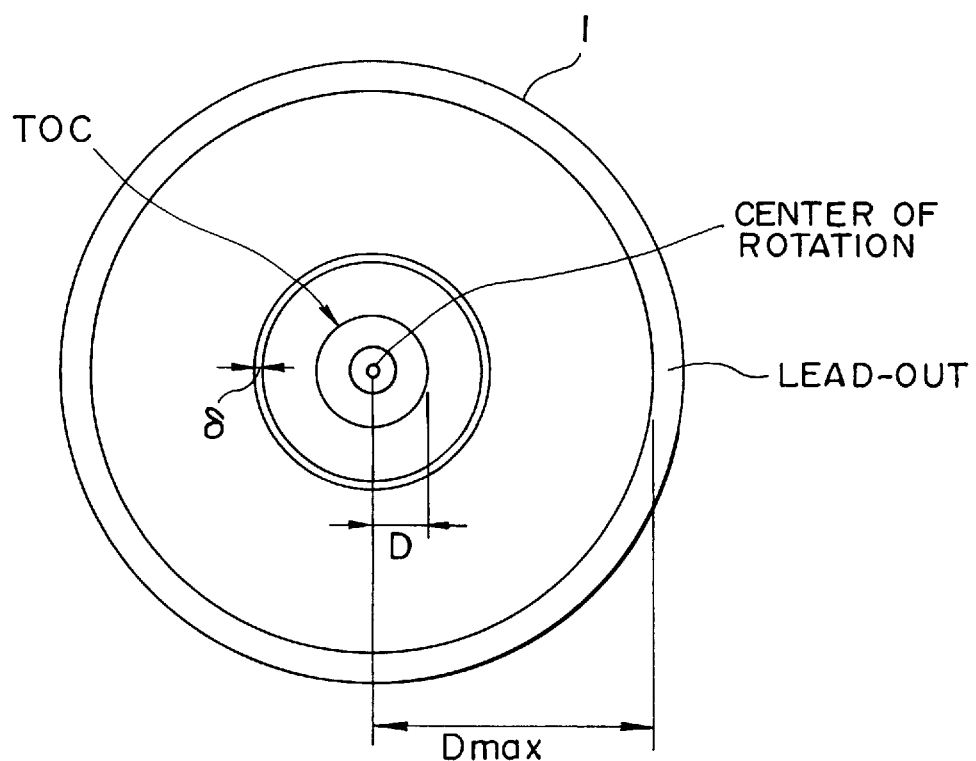
FIG. 1 is a plan view illustrating an example of the construction of a disk 1 used in the present invention.

FIG. 1 is a plan view illustrating a disk 1 to be rotationally driven in accordance with the present invention.

This disk 1 is, for example, a CD-ROM of a common standard; therefore, tracks of the innermost region are formed at the position of radius D (e.g., approximately 23 mm from the center of rotation), and on which tracks is provided a table of contents (TOC) such that information regarding the position at which data is recorded on the disk 1 and the like are described therein. Further, tracks of the outermost region are formed at the position of radius $D_{max}$ (e.g., approximately 58 mm from the center of rotation). Furthermore, tracks are formed in a spiral form at a track pitch δ (e.g., approximately 1.6 μm) on the disk 1.

The total number N of tracks contained on the disk 1 constructed as described above is 21,875 based on equation (1) below. In the following description, calculations are made assuming that the tracks are formed in a concentric shape. Since errors due to this shape are small, there are no problems.

$$
\begin{aligned}
N &= (D_{max} - D)/\delta \\
&= (58 \text{ mm} - 23 \text{ mm})/1.6\,\mu\text{m} \\
&= 21{,}875
\end{aligned}
\tag{1}
$$

Further, the total track length L thereof is 5,564 m based on equation (2):

$$
\begin{aligned}
L &= \Sigma 2\pi(D + n\delta) \\
&= 2\pi(ND + N^2\delta/2) \\
&= 5{,}564 \text{ m}
\end{aligned}
\tag{2}
$$

where Σ is the summation with n varied from 0 to N. Since 1<<N based on equation (1), in equation (2), Σn(=N(N−1)/2) is approximated to $N^2/2$.

Further, it is assumed that data has been recorded on the disk 1 at a fixed data rate by a CLV method (therefore, data has been recorded at a fixed surface density), and the linear velocity v when this disk 1 is reproduced at a 1× speed similarly by a CLV method is set at approximately 1.25 m/s, and a reproduction time T at this time is 74.2 minutes based on equation (3):

$$T = L/v \quad (3)$$
$$= 74.2 \text{ minutes}$$

In this example, the disk 1 of the present invention is not limited to the above-described example. That is, the radiuses of the innermost region and the outermost region of the disk 1, and the track pitch may be other than the above-described values, and further, recording of data may be based on other than the CLV method, for example, a CAV method.

Figure 2:
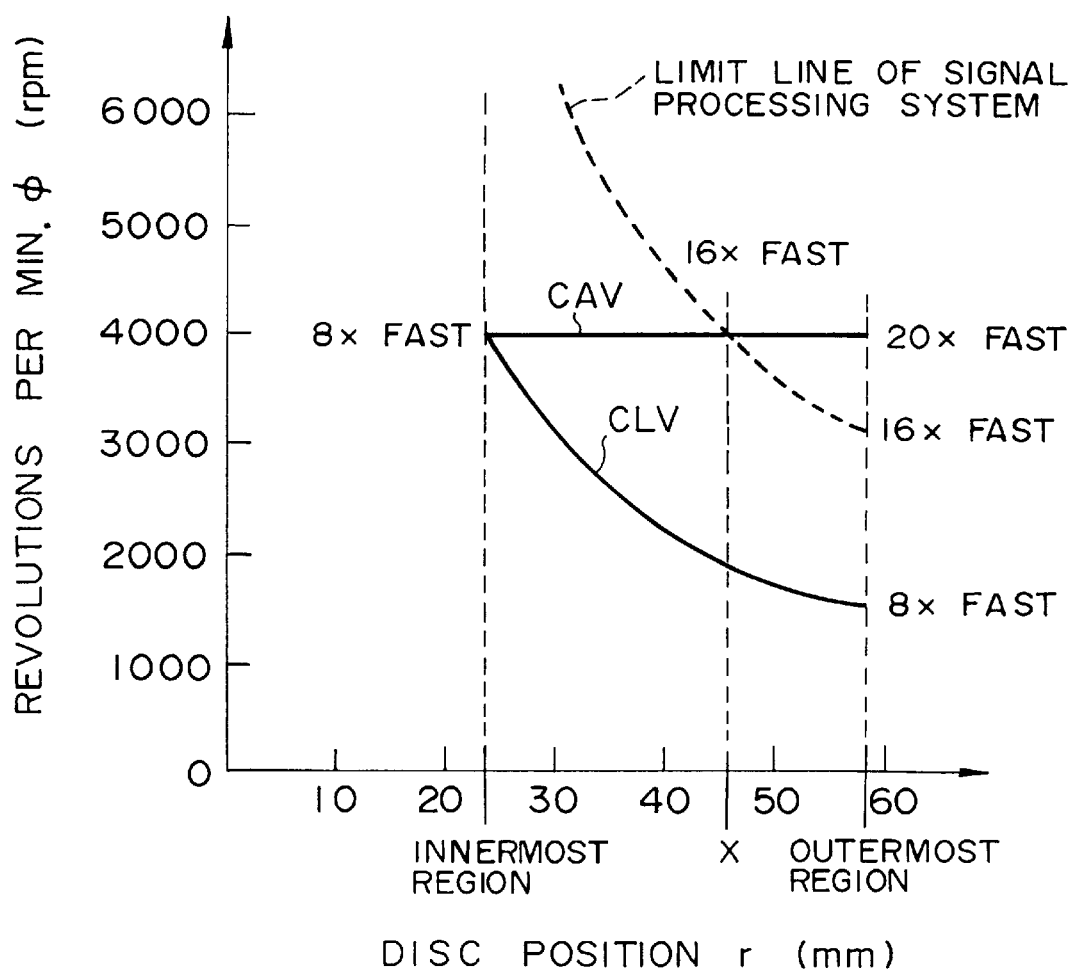
FIG. 2 shows a case in which the disk 1 is rotationally driven by a CLV method in a range which does not exceed a mechanical-system-limit line.

Next, when the disk 1 is reproduced at 8× speed by a CLV method, that is, is reproduced with the linear velocity being always set at 1.25 m/s×8, as shown in FIG. 2, its rotational velocity (the vertical axis in FIG. 2) becomes a maximum of approximately 4,000 rpm in the innermost region, decreases (decreases inversely proportional to the radius (the horizontal axis in FIG. 2)) the further toward the outermost region the reproduction position is located, and becomes approximately 1,600 rpm, which is approximately 1/2.5 of the above in the outermost region.

In this case, as described above, if the rotational velocity of the limit of the mechanical system of the disk drive which reproduces the disk 1 is set at approximately 4,000 rpm, it cannot be said that its performance is effectively used.

Further, in this case, there is an approximately 2.5 (=4,000 rpm/1,600 rpm) times difference in the rotational velocity between the outermost region and the innermost region. If a long-distance traverse is performed, acceleration and deceleration with a large rotational velocity is required, the seek time increases, and consumption of power increases.

Therefore, when, as shown in FIG. 2, the disk 1 is reproduced at an 8× speed in its innermost region and thereafter reproduced by a CAV method up to the outermost region, the linear velocity V in the outermost region is $$V = (8 \times \text{speed}) \times v \times D_{max}/D \quad (4)$$
$$= 25.22 \text{ m/s}$$

The fact that the linear velocity is 25.22 m/s corresponds to a speed 20.17× (=V/v =25.22/1.25). Further, in this case, the rotational velocity φ becomes 4,151.9 rpm based on the following equation:

$$\phi = (\times 8 \text{ speed}) \times v/(2\pi D) \quad (5)$$
$$= 4,151.9 \text{ rpm}$$

Therefore, the reproduction time T of the entire disk 1 in this case becomes 5.27 minutes based on equation (6):

$$T = N/\phi \quad (6)$$
$$= 5.27 \text{ minutes}$$

The fact that the reproduction time T is 5.27 minutes corresponds to a 14.08× speed reproduction on average.

As a result of the above, when the disk 1 is rotationally driven by the CAV method, since the disk 1 is always rotated at approximately 4,000 rpm, which is a rotational velocity of the limit of the mechanical system of the disk drive, its performance can be used effectively.

Further, in the CAV method, since the rotational velocity is fixed regardless of the reproduction position of the disk 1, there is no difference in the rotational velocity between the outermost region and the innermost region; therefore, the seek time does not increase when a long-distance traverse is performed. Furthermore, the spindle servo system becomes open during a traverse, and for this reason, the rotational velocity decreases slightly during the traverse. However, after the traverse, an acceleration should be applied for only returning the slightly decreased rotational velocity to its original rotational velocity and therefore, a large amount of electric power is not consumed by the traverse.

However, in this case, as explained in equation (4), an approximately 20× speed reproduction is performed in the outermost region. Therefore, in a signal processing system for processing reproduced data, it is necessary to perform processing at a velocity of approximately 20 times as high as in a case of 1× speed reproduction. However, at the present time, in a conventional signal processing system, an approximately 16× speed is a limit.

For this reason, if the curve (shown by the dotted line in FIG. 2) representing a reproduction velocity (in this example, 16× speed) of the limit of the processing of the signal processing system is said to be a signal-processing-system-limit line, when the disk 1 is reproduced by a CAV method, reproduced data cannot be processed at a position beyond the signal-processing-system-limit line. Further, if an attempt is made to realize a signal processing system capable of such a high-speed processing, the apparatus becomes enlarged, and the cost thereof increases.

Figure 3:
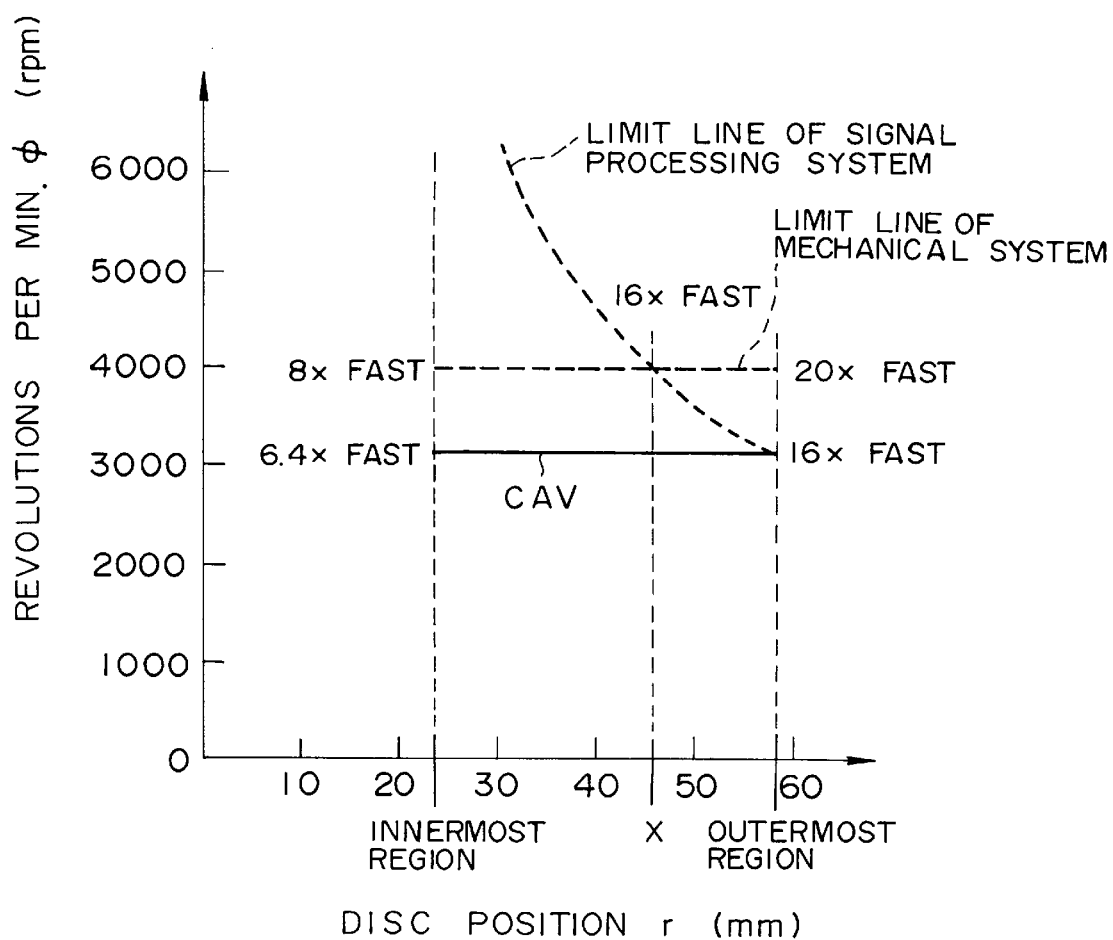
FIG. 3 shows a case in which the disk 1 is rotationally driven by a CAV method in a range which does not exceed a signal-processing-system-limit line.

In connection with the above, as shown in FIG. 3, there is a method of driving the disk 1 by a CAV method at such a rotational velocity as not to exceed the signal-processing-system-limit line in the outermost region. However, in this case, the rotational velocity becomes approximately 3,000 rpm, which falls far below approximately 4,000 rpm, which is the rotational velocity of the limit of the mechanical system.

Figure 4:
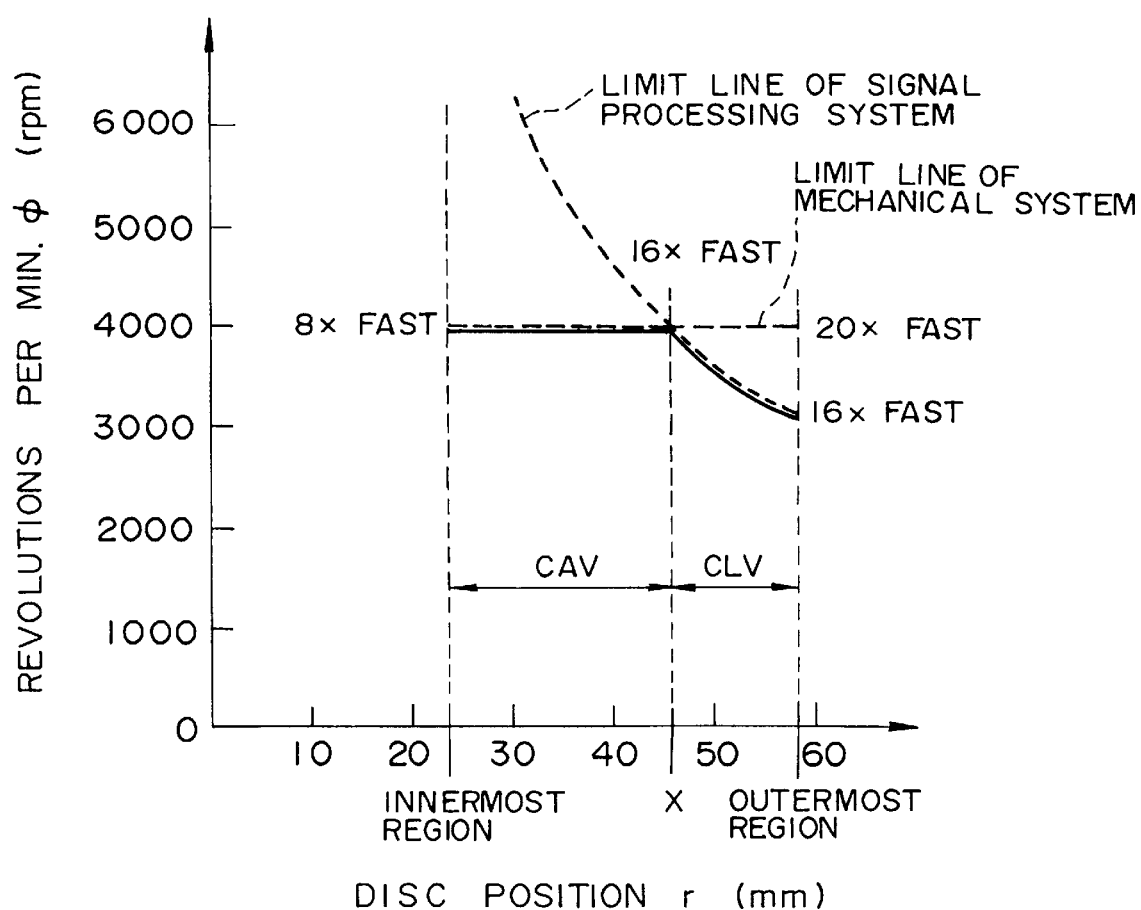
FIG. 4 shows a case in which the disk 1 is rotationally driven by a multi-driving method according to the present invention.

Accordingly, if the straight line (indicated by the dotted line in FIG. 3) representing the rotational velocity (in this example, e.g., approximately 4,000 rpm) of the limit of the mechanical system is assumed to be a mechanical-system-limit line, in order to most effectively utilize the performances of the mechanical system and the signal processing system, as shown in FIG. 4, the rotational velocity may be varied along the mechanical-system-limit line in the area from the innermost region of the disk 1 to the position of radius X (hereinafter appropriately referred to as a limit radius) limited to the signal-processing-system-limit line, or along the signal-processing-system-limit line in the area from the limit radius X to the outermost region.

That is, in this case, specifically speaking, in the area from the innermost region to the position of the limit radius X, the disk 1 may be driven by the CAV method in which the rotational velocity is fixed at approximately 4,000 rpm, and driven by the CLV method so that 16×-speed reproduction is performed in the area from the limit radius X to the outermost region.

A rotational velocity $\phi_1$ in the innermost region in the case of performing such rotational driving is determined to be 4,151.9 rpm, which is similar to the case in equation (5). Further, a rotational velocity $\phi_2$ in the outermost region is 3,293.0 rpm based on equation (7):

$$\phi_2 = (16 \times \text{speed}) \times v/(2\pi D_{max}) \quad (7)$$
$$= 3,293.0 \text{ rpm}$$

Further, the limit radius X is 46 mm based on the following equation:

$$X = (16 \times \text{speed}) \times (8 \times \text{speed}) \times D \quad (8)$$
$$= 46 \text{ mm}$$

Therefore, based upon equation (9), the number $N_1$ of tracks contained in the area from the innermost region to the limit radius X is 14,375:

$$N_1 = (R-D)/\delta \quad (9)$$
$$= 14{,}375$$

When a CD-ROM is used for the disk 1, data has been recorded thereon in frame units, and a subcode such that an absolute time (reproduction time from the innermost region) when reproduction is performed at a 1× speed reproduction, and the like are described is placed in each frame. If the absolute time (hereinafter appropriately referred to as a subcode time) represented by the subcode is denoted as t, based on the following equation, the subcode time t at the limit radius X is 41.6 minutes:

$$\begin{aligned}t &= 1/v(\Sigma 2\pi(D+n\delta)) \quad (10)\\ &= 1/v \times 2\pi(N_1 D + N_1^2 \delta/2)\\ &= 41.6 \text{ minutes}\end{aligned}$$

In equation (10), $\Sigma$ is the summation with n varied from 0 to N, and an approximation similar to that in equation (2) is performed.

Therefore, when, as shown in FIG. 4, data is reproduced by driving the disk 1 by the CAV method from the innermost region to the position of the limit radius X, and by driving it by the CLV method from the position of the limit radius X to the outermost region, the time T (reproduction time) required to reproduce the data is as described below.

That is, a time $T_1$ for reproduction by the CAV method from the innermost region to the position of the limit radius X is 3.46 minutes based on equation $N_1/\phi_1$. Further, a time $T_2$ for reproduction by the CLV method from the position of the limit radius X to the outermost region is determined by dividing a value resulting from subtracting subcode time t (41.6 minutes based on equation (10)) at the limit radius X from the time (74.2 minutes based on equation (3)) required to reproduce the disk 1 at a 1× speed by a 16× speed, i.e., 2.06 minutes.

Therefore, the time T (reproduction time) required to reproduce the entire disk 1 is 5.5 minutes based on equation $T_1+T_2$. The fact that the reproduction time T is 5.5 minutes corresponds to a 13.5× speed reproduction on average, and hardly differs (a decrease in the reproduction velocity of only approximately 4%) from that in the case (the case which exceeds the limit of the signal processing system) in which the entire disk 1 is driven by the CAV method of approximately 4,000 rpm.

Further, in this case, the difference in the rotational velocity between the outermost region and the innermost region is approximately 1.25 times based on the equation $100_{\ 1}/\phi_2$, and the difference in the rotational velocity (approximately 2.5 times) is not much greater than that in which the entire disk 1 is reproduced by the CLV method. Hence, even if a long-distance traverse is performed, no acceleration or deceleration with a large rotational velocity is required. Therefore, the seek time does not increase, and neither does the consumption of power. When, in particular, a traverse is performed within the area from the innermost region to the position of the limit radius, an acceleration for returning the rotational velocity slightly decreased during the traverse to its original rotational velocity should be applied in a manner similar to the case in which the entire disk 1 is reproduced by the CAV method. Therefore, a large amount of electric power is not consumed by the traverse.

Hereinafter, a method of driving the disk 1 by a different rotational driving method when different areas of the disk 1 are reproduced as appropriately shown in FIG. 4 will be called a multi-driving method.

Figure 5:
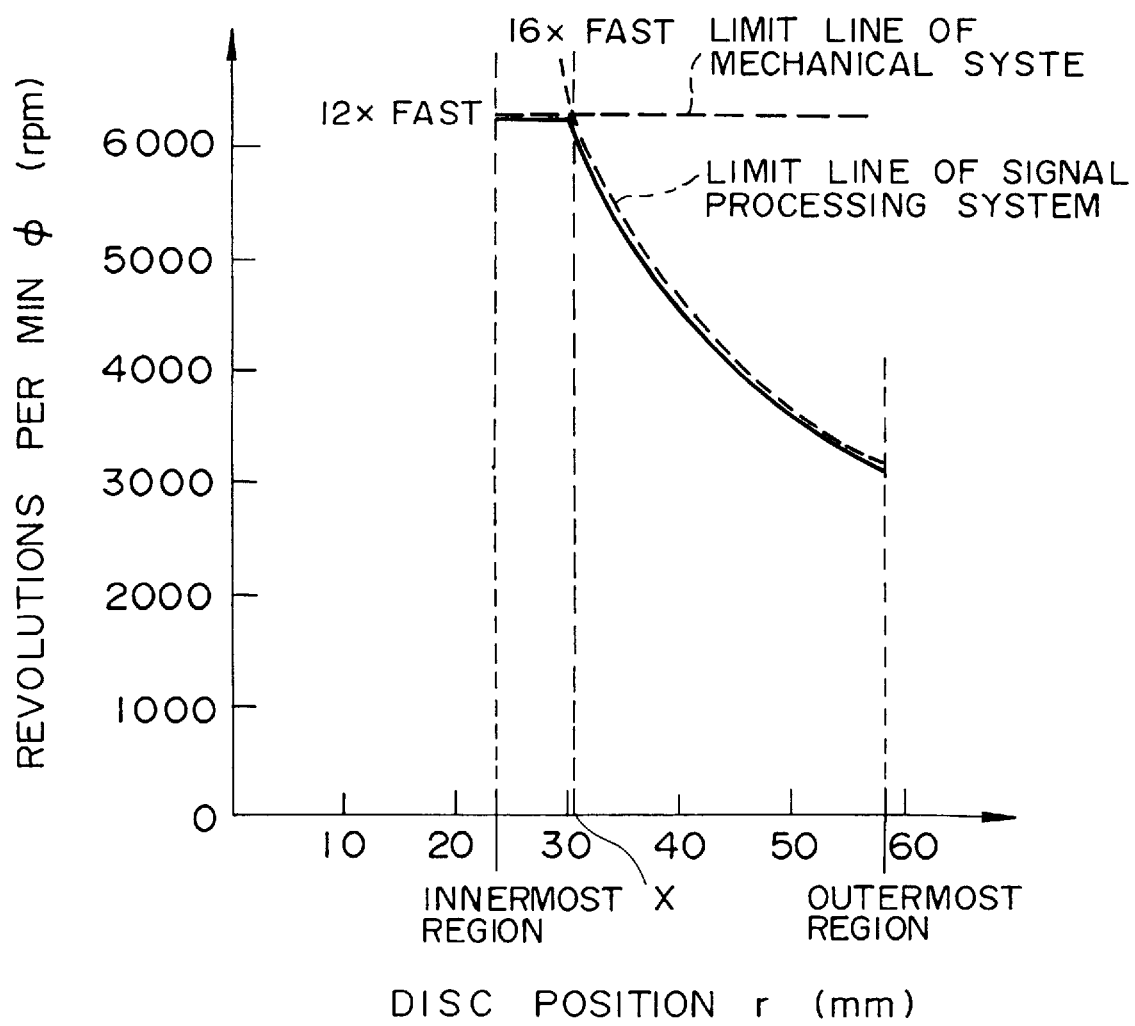
FIG. 5 shows a case in which the disk 1 is rotationally driven by the multi-driving method according to the present invention.

In FIG. 4, the limit of the rotational velocity of the mechanical system is set at approximately 4,000 rpm, and the reproduction velocity which the signal processing system can handle is at 16× speed reproduction. These values vary due to the performance of individual apparatuses and with the advancement of technology. When, for example, the limit of the rotational velocity of the mechanical system becomes high to reach approximately 6,200 rpm, as shown in FIG. 5, rotational driving may be performed by the CAV method in which the rotational velocity is fixed at approximately 6,200 rpm along a direction from the inner region toward the outer region until the linear velocity reaches a value corresponding to a 16× speed, and in the outer region from there, rotational driving may be performed by the CLV method in which the linear velocity corresponds to a 16× speed.

In this case, the reproduction velocity in the innermost region is approximately 12× speed. Assuming that the reproduction velocity in the innermost region is 12× speed, its rotational velocity $\phi_1$ is determined to be 6,227.9 rpm based on the following equation:

$$\begin{aligned}\phi_1 &= (16 \times \text{speed}) \times v/(2\pi D) \quad (11)\\ &= 6{,}227.9 \text{ rpm}\end{aligned}$$

Further, in this case, the rotational velocity 42 is 3,293.0 rpm in a manner similar to that in equation (7).

Furthermore, the limit radius X is 30.7 mm based on the following equation:

$$\begin{aligned}X &= (16 \times \text{speed})/(12 \times \text{speed}) \times D \quad (12)\\ &= 30.7 \text{ mm}\end{aligned}$$

Therefore, the number $N_1$ of tracks contained in the area from the innermost region to the limit radius X is 4,375 based on equation (13):

$$\begin{aligned}N_1 &= (R-D)/\delta \quad (13)\\ &= 4{,}375\end{aligned}$$

Furthermore, in this case, the subcode time t at the limit radius X is 9.7 minutes based on the following equation:

$$\begin{aligned}t &= 1/v(\Sigma 2\pi(D+n\delta)) \quad (14)\\ &= 1/v \times 2\pi(N_1 D + N_1^2 \delta/2)\\ &= 9.7 \text{ minutes}\end{aligned}$$

Also in equation (14), $\Sigma$ is the summation with n varied from 0 to N, and an approximation similar to that in equation (2) is performed.

Therefore, as shown in FIG. 5, when data is reproduced by driving the disk 1 by the CAV method from the innermost region to the position of the limit radius X, and by driving it by the CLV method from the position of the limit radius X to the outermost region, the reproduction time T is as described below.

That is, a time $T_1$ for reproduction by the CAV method from the innermost region to the position of the limit radius X is 0.7 minutes based on equation $N_1/\phi_1$. Further, a time $T_2$ for reproduction by the CLV method from the position of the limit radius X to the outermost region is determined by dividing a value resulting from subtracting subcode time t (9.7 minutes based on equation (14)) at the limit radius X from the time (74.2 minutes based on equation (3)) required to reproduce the disk 1 at a 1× speed by a 16× speed, i.e., 4.03 minutes.

Therefore, the time T (reproduction time) required to reproduce the entire disk 1 is 4.73 minutes based on equation $T_1+T_2$. The fact that the reproduction time T is 4.73 minutes corresponds to a 15.7× speed reproduction on average, and hardly differs from that in the case in which the entire disk 1 is driven by the CLV method of a 16× speed. When the entire disk 1 is driven by the CLV method of a 16× speed, a mechanical system capable of rotationally driving the disk 1 stably at a rotational velocity of approximately 8,000 rpm in the innermost region is required. However, according to the multi-driving method, a comparable performance can be obtained by a mechanical system capable of rotationally driving the disk 1 stably at a rotation al velocity of approximately 6,000 rpm.

Further, in this case, the difference in the rotational velocity between the outermost region and the innermost region is approximately 1.9 times based on the equation $\phi_1/\phi_2$, and the difference in the rotational velocity is not much greater than that (approximately 2.5 times) in which the entire disk 1 is reproduced by the CLV method. Hence, even if a long-distance traverse is performed, no acceleration or deceleration with a large rotational velocity is required. Therefore, the seek time does not increase, and neither does the consumption of power.

Figure 6:
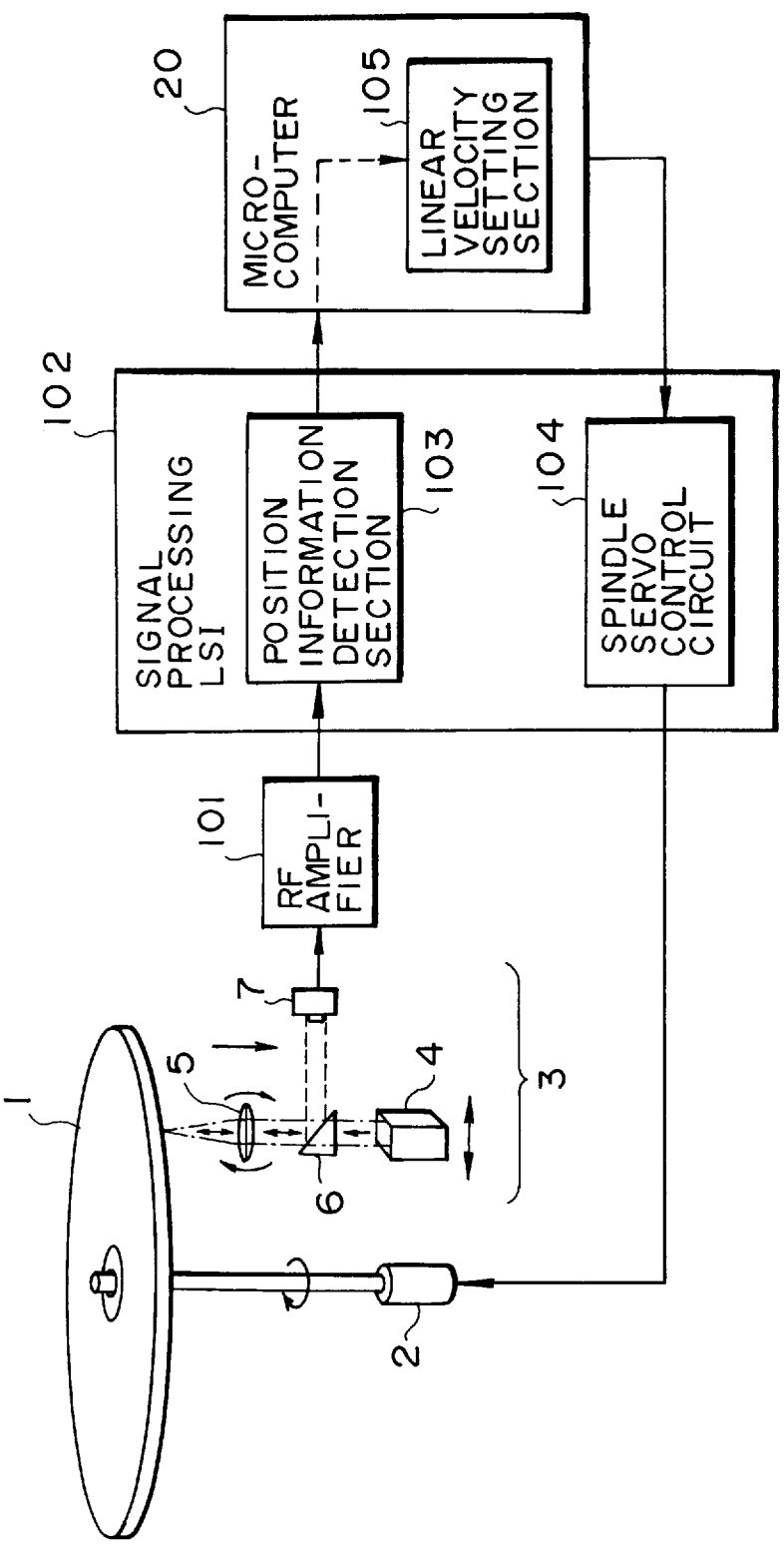
FIG. 6 is a block diagram illustrating the construction of a first embodiment of a disk drive for rotationally rotating the disk 1 by the multi-driving method according to the present invention.

Next, FIG. 6 shows an example of the construction of a disk drive which rotationally drives the disk 1 and reproduces data by the above-described multi-driving method.

For example, the disk 1, such as a CD-ROM, is rotationally driven by a spindle motor 2, and access to the disk 1 is performed by an optical pick-up 3.

More specifically, the optical pick-up 3 is formed of a laser diode 4, an object lens 5, a beam splitter 6, and a photodetector (PD) 7. The laser diode 4 emits an optical beam, and this optical beam enters the object lens 5 through which the optical beam is converged onto the disk 1. The optical beam converged onto the disk is reflected thereby, the reflected light enters the beam splitter 6 whereby the light is reflected nearly 90° and enters the PD 7. The PD 7 receives the light reflected from the beam splitter 6 and outputs a radio frequency (RF) signal as an electrical signal corresponding to the amount of received light.

This RF signal is supplied to an RF amplifier 101 where amplification, equalization or other processing is performed thereon, and supplied to a signal processing LSI (Large Scale Integrated circuit) 102. The signal processing LSI 102 has incorporated therein a position information detection section 103, a spindle servo control circuit 104 and the like as functional blocks, and the RF signal from the RF amplifier 101 is input to the position information detection section 103.

In the position information detection section 103, a subcode is extracted from the RF signal, and a subcode time indicated by the subcode is detected. Here, the subcode time, as described above, is an absolute time (reproduction time from the innermost region) when reproduction is performed at a 1× speed. Therefore, based on this subcode time, it is possible to recognize the position of the optical pick-up 3, i.e., the position (area) of the disk 1 that the optical pick-up 3 is accessing. Based on this fact, it may be said that the subcode time is position information indicating the position on the disk 1.

The position information detection section 103 recognizes the position of the optical pick-up 3 on the basis of the subcode time and supplies it to a microcomputer 20. The microcomputer 20 is formed of a CPU (Central Processing Unit), ROM (read Only memory), RAM (random access memory), all of which are not shown, and the like. The spindle motor 2 is controlled via the spindle servo control circuit 104 so that the linear velocity (the linear velocity of the disk 1 with respect to the optical pick-up 3) of the disk 1 at the position of the optical pick-up 3 from the position information detection section 103 reaches a predetermined velocity.

That is, the microcomputer 20 has incorporated therein a linear velocity setting section 105 and the like as functional blocks. The linear velocity setting section 105 sets a linear velocity so that the disk 1 is rotationally driven by the multi-driving method shown in FIG. 4 or 5 on the basis of the position of the optical pick-up 3 from the position information detection section 103.

To be specific, in a case in which, for example, the mechanical-system-limit line and the signal-processing-system-limit line relating to the disk drive of FIG. 6 are as shown in FIG. 4, when the optical pick-up 3 is accessing an area from the innermost region of the disk 1 to the limit radius X, the linear velocity is set so that the disk 1 is rotationally driven by the CAV method at a fixed rotational velocity of approximately 4,000 rpm (precisely, 4,151.9 rpm based on equation (5)). Also, when the optical pick-up 3 is accessing an area from the limit radius X of the disk 1 to the outermost region, the linear velocity is set so that the disk 1 is rotationally driven by the CLV method at a fixed linear velocity corresponding to a 16× speed.

The linear velocity set by the linear velocity setting section 105 is supplied to the spindle servo control circuit 104 of the signal processing LSI 102. The spindle servo control circuit 104 controls the spindle motor 2 so that the linear velocity at the position of the disk 1 that the optical pick-up 3 is accessing coincides with the linear velocity from the linear velocity setting section 105. The spindle motor 2 rotationally drives the disk 1 under control from the spindle servo control circuit 104 and, as a result, the disk 1, as shown in FIG. 4, is rotationally driven by the CAV method or the CLV method when the optical pick-up 3 is accessing the area from its innermost region to the limit radius X or the area from the limit radius X to the outermost region, respectively.

Next, FIG. 7 shows in more detail an example of the construction of the disk drive in FIG. 6. Components in FIG. 7 which correspond to components in FIG. 6 are given the same reference numerals. In FIG. 7, the RF amplifier 101 of FIG. 6 corresponds to an I/V (current/voltage) amplifier 8, an RF equalizer 9, and the signal processing LSI 102 corresponds to a digital signal processor (DSP) 10 (signal processing system), an optical-system servo signal processing circuit 22, a low-pass filter (LPF) 23, a VCO 24, a switch 25, an OSC 26 (including a crystal XTAL), a frequency divider 27, a phase comparator 28, a frequency divider 29, an LPF 30, a velocity detector 32, and a frequency divider 33. Further, in FIG. 7, the position information detection section 103 of FIG. 6 corresponds to a subcode processing section 13, and the spindle servo control circuit 104 corresponds to a spindle servo signal processing circuit 18, an LPF 23, a VCO 24, an OSC 26, a frequency divider 27, a phase comparator 28, and a frequency divider 29.

As described above, the optical pick-up 3 radiates an optical beam onto the disk 1 and outputs an RF signal upon receiving light reflected therefrom. The optical pick-up 3 has incorporated therein a tracking actuator and a focus actuator (both of which are not shown). The tracking actuator or the focus actuator causes the position of the spot of the optical beam formed on the disk 1 to move in what is called a tracking direction (radius direction) or the focus direction (the optical-axis direction of the optical beam), respectively. Further, the optical pick-up 3 is moved in the radius direction of the disk 1 by a thread feed motor (coarse driving motor) (not shown), and as a result, the optical pick-up 3 is made to seek a position corresponding to a desired track.

The RF signal output from the optical pick-up 3 is supplied to the I/V amplifier 8. In the I/V amplifier 8, the RF signal is converted from a current into a voltage signal and supplied to the RF equalizer 9. In the RF equalizer 9, the waveform of the RF signal from the I/V amplifier 8 is shaped and supplied to the DSP 10 and the optical-system servo signal processing circuit 22.

In the optical-system servo signal processing circuit 22, based on the RF signal from the RF equalizer 9, the tracking servo system, the focus servo system, and the thread servo system are controlled. That is, the optical-system servo signal processing circuit 22 generates and outputs servo signals for driving the tracking actuator, the focus actuator and the thread feed motor. As a result, the tracking actuator drives the object lens 5 so that the spot of the optical beam formed on the disk 1 follows the track to be reproduced, and the focus actuator drives the object lens 5 so that the optical beam is converged on the disk 1. Further, the thread feed motor causes the optical pick-up 3 to move to the position corresponding to the track to be reproduced.

Meanwhile, the DSP 10 is formed of a phase-locked loop (PLL) asymmetry correction circuit 11, an eight to fourteen modulation (EFM) demodulation circuit 12, a subcode processing section 13, a RAM 14, an error correction circuit 15, a deinterleave circuit 16, a clock generator 17, and a spindle servo signal processing circuit 18, and performs various signal processings (digital signal processings).

That is, the RF signal output from the RF equalizer 9 is input to the PLL asymmetry correction circuit 11 whereby the asymmetry of the RF signal, i.e., the center of the eye pattern of the RF signal being shifted from the center of its amplitude, is corrected. The PLL asymmetry correction circuit 11 has incorporated therein a PLL circuit (not shown) for generating a clock from the RF signal (binary signal), and corrects asymmetry on the basis of a clock generated by the PLL circuit.

The RF signal whose asymmetry has been corrected by the PLL asymmetry correction circuit 11 is supplied to the EFM demodulation circuit 12. In the EFM demodulation circuit 12, the RF signal is EFM-demodulated, the demodulated signals obtained thereby are separated into data (e.g., computer programs, images, characters, audio signals and so on) as information, and a code (e.g., cross interleave Reed-Solomon code (CIRC)) for error correction and detection and a subcode. The data and the CIRC code are supplied to the RAM 14, and the subcode is supplied to the subcode processing section 13.

The RAM 14 temporarily stores the data and the CIRC code from the EFM demodulation circuit 12. Then, in the error correction circuit 15, error correction of data stored in the RAM 14 is performed based on the CIRC code similarly stored in the RAM 14. Thereafter, in the deinterleave circuit 16, error-corrected data is read in a predetermined sequence from the RAM 14, and as a result, data such that the interleave of CIRC has been released is output.

The spindle servo signal processing circuit 18 monitors data (e.g., a synchronization signal of the frame made up of the data, and the like) that the deinterleave circuit 16 reads from the RAM 14 and thus recognizes the data reproduction rate. Then, in the spindle servo signal processing circuit 18, an error (difference) in the data reproduction rate (this corresponds to the linear velocity at the position at which the optical pick-up 3 accesses the disk 1) with respect to the frequency of the clock which the VCO 24 outputs is generated, and this is output as a servo error signal (spindle servo error signal) to the LPF 23.

In the LPF 23, the servo error signal from the spindle servo signal processing circuit 18 is filtered, thus the high-frequency components thereof are cut and supplied to the VCO 24. The VCO 24 outputs a variable clock which is a clock of a variable frequency. That is, the VCO 24 generates a variable clock (VCOCK) of a frequency for making the servo error signal from the LPF 23 zero and outputs it to the terminal y of the switch 25, the frequency divider 27 and the velocity detector 32. Here, since the variable clock at which the servo error signal reaches zero is synchronized with the reproduction rate of data from the disk 1, it is possible to recognize the reproduction rate, i.e., the linear velocity at the position at which the optical pick-up 3 accesses the disk 1, on the basis of the frequency of this variable clock.

The frequency divider 27 frequency-divides the variable clock from the VCO 24 by a frequency-dividing ratio M (when the frequency of the variable clock is denoted as fv, its frequency is set to fv/M) and supplies it to one of the input terminals of the phase comparator 28. Further, an output of the frequency divider 29 is supplied to the other input terminal of the phase comparator 28, and the frequency divider 29 frequency-divides the output of the OSC 26 by a frequency-dividing ratio N and supplies it to the phase comparator 28.

The OSC 26 generates a fixed clock which is a clock of a fixed frequency, for example, 16.9344 MHz (=44.1 kHz× 384) and supplies it to the terminal x of the switch 25, and the frequency dividers 29 and 33.

Therefore, in the frequency divider 29, a fixed clock from the OSC 26 is frequency-divided by the frequency-dividing ratio N (when the frequency of the fixed clock is denoted as fc, its frequency is set to fc/N) and is supplied to the phase comparator 28.

The phase comparator 28 compares the output of the frequency divider 27 with that of the frequency divider 29 and detects the difference between the phases thereof. This phase difference is filtered by the LPF 30 and, supplied, as a drive signal for the spindle motor 2, to a driver 31. The driver 31 causes the spindle motor 2 to be rotationally driven in accordance with a drive signal from the LPF 30.

The frequency-dividing ratio M or N in the frequency divider 27 or 29 is respectively set by the microcomputer 20.

The switch 25 is connected to the clock generator 17. Therefore, when the switch 25 selects terminal x or y, a fixed clock or a variable clock is respectively supplied to the clock generator 17. The clock generator 17 generates a system clock of a frequency corresponding to the input signal and supplies it to each block making up the DSP 10. That is, the clock generator 17 generates a system clock of 16.9344 MHz in accordance with the fixed clock when the switch 25 selects terminal x, generates a system clock which causes the servo error signal output from the spindle servo signal processing circuit 18 to be zero in accordance with a variable clock when the switch 25 selects terminal y, and supplies it to each block making up the DSP 10.

As a result, each block making up the DSP 10 operates in synchronization with the system clock of 16.9344 MHz when the switch 25 selects terminal x and in synchronization with a system clock which causes the servo error signal output from the spindle servo signal processing circuit 18 to be zero when the switch 25 selects terminal y.

Therefore, when the switch 25 selects terminal y, even if there are variations in the rotation of the disk 1, the system clock varies so as to follow the variations, that is, each block making up the DSP 10 operates following the rotation of the disk 1. Therefore, even if variations occur in the rotation of the disk 1 due to, for example, a disturbance, it becomes possible to perform signal processing synchronized with said disturbance. In an extreme case, even when, for example, the disk 1 is rotated by the hand of the user, signal processing becomes possible.

Further, when the switch 25 selects terminal y, by setting the frequency-dividing ratio M or N in the frequency divider 27 or 29 to an appropriate value, it becomes possible to reproduce data at a desired reproduction rate from the disk 1.

That is, in a case in which, for example, 1× speed reproduction is performed when the disk 1 is rotationally driven in synchronization with the fixed clock, when M and N are set to be the same value, the variable clock output by the VCO 24 coincides with the frequency of the fixed clock output by the OSC 26, and as a result, the spindle motor 2 is rotationally driven so that 1× speed reproduction is performed.

Further, if the frequency of the fixed clock or the variable clock is denoted as Fc or Fv, respectively, the VCO 24 outputs a variable clock of a frequency Fv such that equation Fc/N=Fv/M is satisfied. Therefore, when, for example, M/N=2 is set, the spindle motor 2 is rotationally driven so that 2× speed reproduction is performed.

The switch 25 selects either one of the terminal x or y under control of the microcomputer 20. That is, when data must be reproduced in synchronization with a system clock of a fixed frequency (e.g., when the disk 1 is an audio CD in which audio data has been recorded such that wow and flutter occurs as a result of the change in the reproduction rate) (in order to prevent this wow and flutter, a huge-capacity memory is required), the microcomputer 20 causes the switch 25 to select terminal x and otherwise select terminal y.

The frequency-dividing ratios M and N, as described above, are set by the microcomputer 20. By setting these frequency-dividing ratios M and N at appropriate values, the microcomputer 20 controls the rotational velocity of the disk 1 by the spindle motor 2, i.e., the reproduction velocity (the linear velocity at the position where the optical pick-up 3 is accessing the disk 1) of data from the disk 1.

That is, the output of the subcode processing section 13 is supplied to the microcomputer 20. The subcode processing section 13 processes the subcode from the EFM demodulation circuit 12 in order to determine the subcode time and supplies it to the microcomputer 20.

In the microcomputer 20, the position at which the optical pick-up 3 is accessing the disk 1 is recognized based on the subcode time from the subcode processing section 13. When the position is within the area from the innermost region to the limit radius X or within the area from the limit radius X to the outermost region, the frequency-dividing ratios M and N are set so that the disk 1 is rotationally driven by the CAV or CLV method, respectively.

To be specific, as shown in FIG. 4, when, for example, the disk 1 is rotationally driven, as described in equation (10), the subcode time at the limit radius X is 41.6 minutes. Therefore, the microcomputer 20 sets the frequency-dividing ratio M so that a linear velocity can be obtained by which the rotational velocity is fixed at 4,000 rpm during the time in which the subcode time is from 0 minutes (the innermost region) to 41.6 minutes, sets the frequency-dividing ratio N so that a linear velocity can be obtained by which the reproduction rate (the rotational velocity) is a 16× speed during the time in which the subcode time is from 41.6 minutes to 74.2 minutes (the outermost region (equation (3)), and supplies the frequency-dividing ratios M and N to the frequency dividers 27 and 29. Therefore, in this case, when the limit of processing of the spindle motor 2 or the DSP 10 is respectively represented by the mechanical-system-limit line or the signal-processing-system-limit line shown in FIG. 4, as described above, it is possible to rotationally drive the disk 1 efficiently and to process the data thereof.

Meanwhile, in the embodiment shown in FIG. 7, the velocity detector 32 is provided, and an output (MCUDT) of this velocity detector 32 is supplied to the microcomputer 20. In addition to an output (VCOCK) (variable clock) of the VCO 24 being supplied to the velocity detector 32 as described above, a fixed clock is supplied thereto from the OSC 26 via the frequency divider 33, and further, a read signal MCULD and a clock MCUCK are supplied thereto from the microcomputer 20. Further, the velocity detector 32 counts the variable clock VCOCK output by the VCO 24 at predetermined intervals and supplies the count value MCUDT to the microcomputer 20.

Here, as described above, since the variable clock is synchronized with the reproduction rate of data from the disk 1, the frequency of this variable clock, i.e., the count value of the variable clock in a predetermined period, corresponds to the linear velocity at the position where the optical pick-up 3 is accessing the disk 1. Therefore, by counting the variable clock at predetermined intervals, the linear velocity of the disk 1 can be determined.

Accordingly, the microcomputer 20 recognizes the linear velocity of the disk 1 on the basis of the output from the velocity detector 32. When the linear velocity is different from an ideal value, the microcomputer 20 corrects the frequency-dividing ratios M and N in order to cause the linear velocity of the disk 1 to coincide with the ideal value.

The details of a disk drive capable of reproduction at a desired reproduction velocity by setting the frequency-dividing ratios M and N are disclosed in, for example, Japanese Patent Application No. 7-241068 (or European Patent Publication No. EP0714097-A) that the applicant of the present invention previously submitted for patent.

Figure 8:
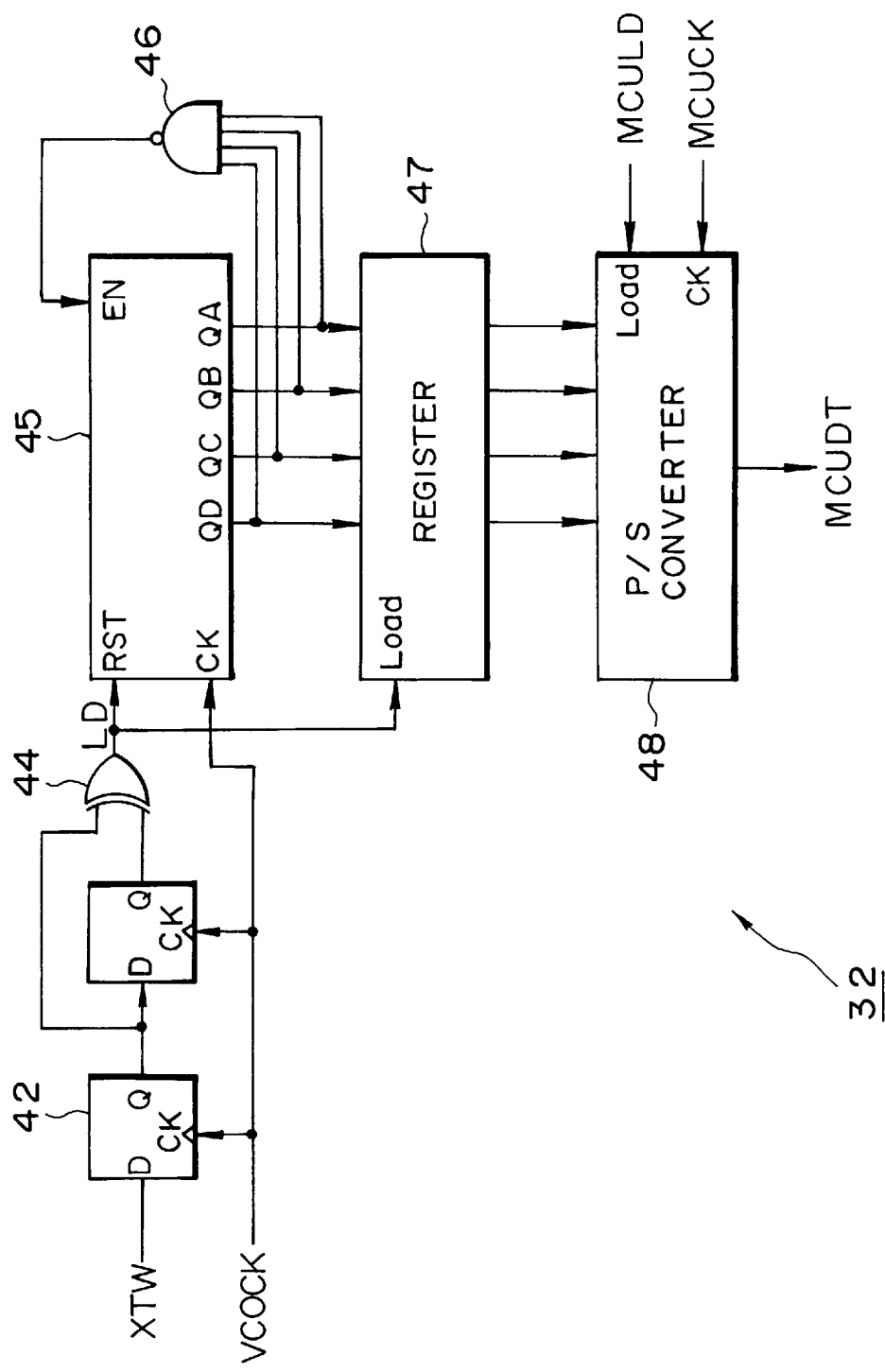
FIG. 8 is a block diagram illustrating an example of the construction of a velocity detector 32 in FIG. 7.

Next, FIG. 8 shows an example of the construction of the velocity detector 32 in FIG. 7. FIGS. 9A, 9B, 9C, 9D, 9E and 9F show timing charts thereof.

A frequency-dividing signal XTW (FIG. 9B) resulting from frequency-dividing a fixed clock XTAL (FIG. 9A) output by the OSC 26 by a frequency-dividing ratio L (e.g., L=8) in the frequency divider 33 (FIG. 7) is supplied to a D flip-flop 42. This D flip-flop 42 latches the frequency-dividing signal XTW at the timing (e.g., the timing of the rising edge thereof) of the variable clock VCOCK (FIG. 9C) output by the VCO 24.

Figure 9:
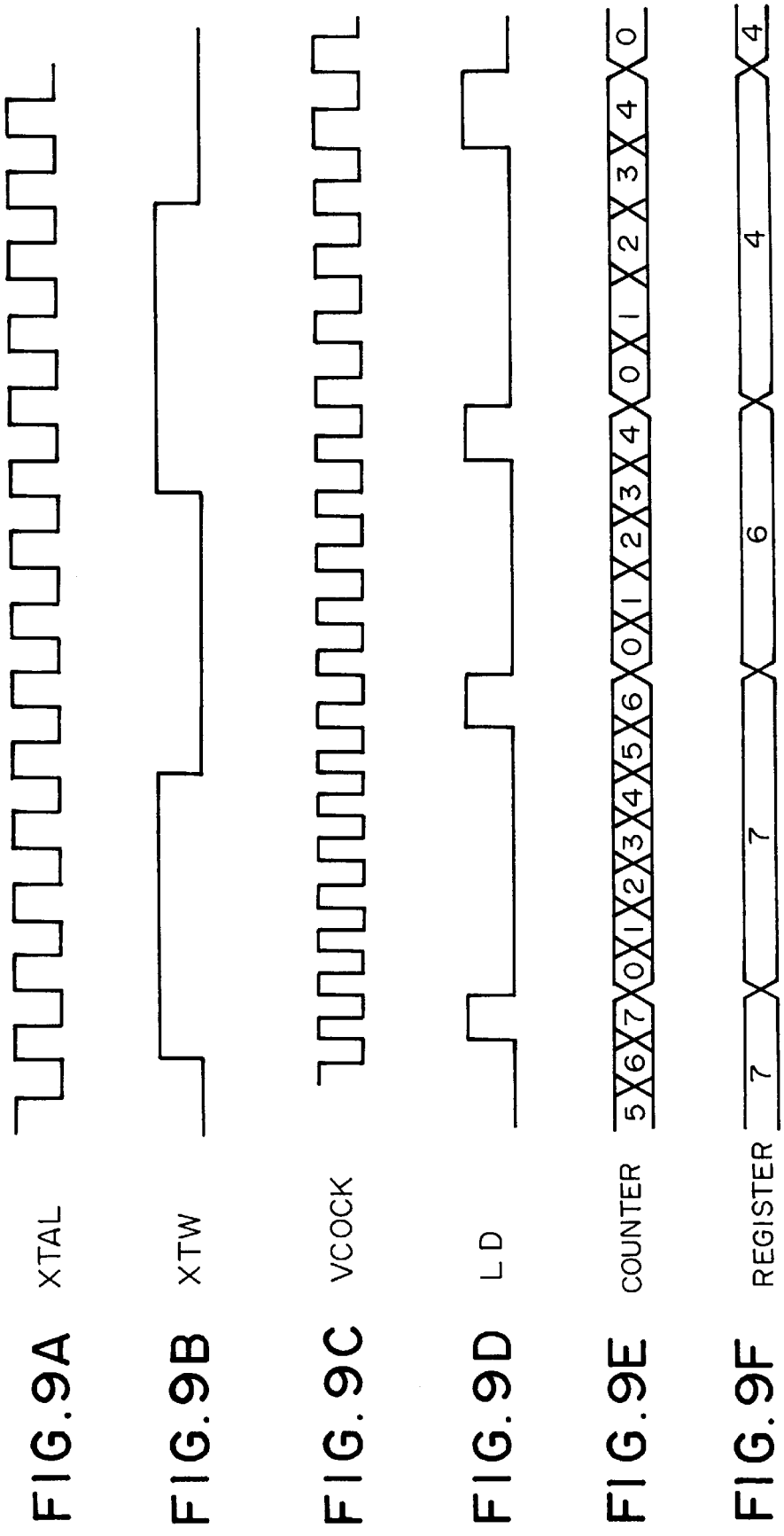
FIGS. 9A, 9B, 9C, 9D, 9E and 9F are timing charts illustrating the operation of the velocity detector 32 in FIG. 8.

At this point, in the embodiment of FIG. 9, the cycle of the frequency-dividing signal XTW (FIG. 9B) is made 8 times the cycle of the fixed clock XTAL. However, how many times the cycle of the frequency-dividing signal XTW is made with respect to the cycle of the fixed clock XTAL is not particularly limited. For example, it may be determined by the accuracy of the count value of the variable clock VCOCK or by other factors.

The output of the D flip-flop 42 is supplied to the input terminal D of a D flip-flop 43 and one of the input terminals of an OR gate 44. In the D flip-flop 43, similar to the case of the D flip-flop 42, the output of the D flip-flop 43 is latched at the timing of the variable clock VCOCK (FIG. 9C) and supplied to the other input terminal of the OR gate 44.

In the OR gate 44, OR (logical OR) of the outputs of the D flip-flops 42 and 43 is computed. The computation result is supplied as a load signal LD (FIG. 9D) to a reset terminal RST of a counter 45 and a load terminal Load of a register 47.

The counter 45 is, for example, a 4-bit counter, with a variable clock VCOCK being supplied to the clock terminal CK thereof. And, the counter 45 counts the variable clock VCOCK supplied to the clock terminal CK and outputs the 4-bit count value (e.g., QA, QB, QC, and QD from the most significant bit (MSB) (FIG. 8)) obtained thereby to the register 47 while resetting the count value at the timing of the load signal LD (e.g., the timing of the rising edge thereof) supplied to the reset terminal RST thereof.

The 4-bit count value (FIG. 9E) output by the counter 45 is also supplied to a 4-input NAND gate 46 whereby the NAND (NOT AND) of the 4-bit count value from the counter 45 is computed and supplied to an enable terminal EN of the counter 45. When "1" is input to the enable terminal EN, the counter 45 counts the variable clock VCOCK, and when "0" is input to the enable terminal EN, the counter 45 stops the count operation. Therefore, when the counter 45 is likely to overflow, i.e., the count value reaches 1111B (B indicates that the preceding numeric characters are binary) in the embodiment of FIG. 8, the counter 45 holds the count value as it is.

The register 47 is, similar to the counter 45, for example, a register made up of 4 bits. The register 47 reads and stores a count value (FIG. 9E) output by the counter 45 at the timing of the load signal LD (FIG. 9D) supplied to the load terminal Load thereof. As a result, a count value (FIG. 9F) such that the variable clock VCOCK (FIG. 9C) from a certain load signal LD to the next load signal is counted is stored in the register 47.

The count value stored in the register 47 is output to a parallel/serial (P/S) converter 48. The P/S converter 48 converts the 4-bit count value as parallel data supplied from the register 47 into serial data MCUDT in synchronization with the clock MCUCK supplied from the microcomputer 20 and supplies the serial data MCUDT to the microcomputer 20 at the timing of the load signal MCULD supplied from the microcomputer 20.

More specifically, in this embodiment, as an interface between the microcomputer 20 and the velocity detector 32, for example, a serial interface is used. In the P/S converter 48, the count value of the variable clock VCOCK in a predetermined period, corresponding to the linear velocity, is converted from parallel data into serial data and supplied to the microcomputer 20.

Figure 10:
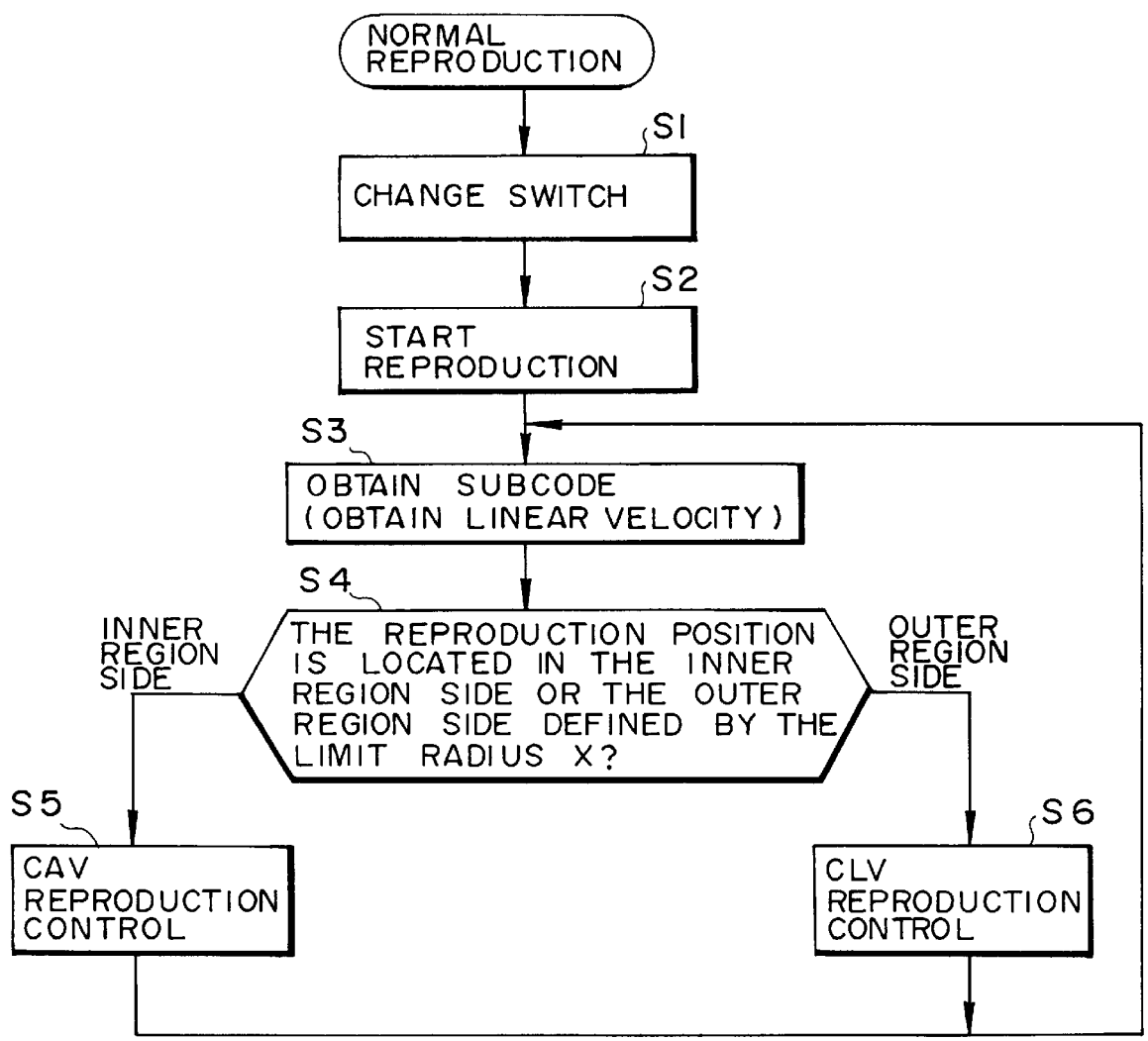
FIG. 10 is a flowchart illustrating the operation of the disk drive in FIG. 7.

Next, with reference to the flowchart of FIG. 10, a further description will be given of the operation of the disk drive of FIG. 7, for example, when the disk 1 is rotationally driven by the multi-driving method shown in FIG. 4. When, for example, the reproduction of the disk 1 is instructed as a result of the operation of an operation section (not shown), in step S1, the microcomputer 20 controls the switch 25 in order to change this switch 25 to the terminal y side. Then, in step S2, the reproduction of the disk 1 is started, that is, an optical beam emitted from a laser diode 4 is radiated onto the disk 1. This optical beam is reflected from the disk 1, and the reflected light is received by the PD 7. In the PD 7, the light reflected from the disk 1 is photoelectrically converted into an RF signal, and this signal is supplied to the DSP 10 via the I/V amplifier 8 and the RF equalizer 9.

In the DSP 10, the RF signal is processed by the PLL asymmetry correction circuit 11 and the EFM demodulation circuit 12, and a subcode obtained thereby is supplied to the subcode processing section 13. In the subcode processing section 13, a subcode time is detected from the subcode and supplied to the microcomputer 20. In the microcomputer 20, this subcode time is received in step S3.

Upon receiving the subcode time in the microcomputer 20, the process proceeds from step S3 to step S4 where it is determined whether the reproduction position (the position of the disk 1 that the optical pick-up 3 is accessing) of the disk 1 by means of the optical pick-up 3 is located in the inner region side or the outer region side defined by the limit radius X on the basis of the subcode time as described above.

When it is determined in step S4 that the reproduction position of the disk 1 by means of the optical pick-up 3 is located in the inner region side from the limit radius X, the process proceeds to step S5 where the frequency-dividing ratios M and N are set and supplied to the frequency dividers 27 and 29 by the microcomputer 20 so that the disk 1 is rotationally driven by the CAV method. Then, the process returns to step S3, and thereafter, similar processing is repeated.

On the other hand, when it is determined in step S4 that the reproduction position of the disk 1 by means of the optical pick-up 3 is located in the outer region side from the limit radius X, the process proceeds to step S6 where the frequency-dividing ratios M and N are set and supplied to the frequency dividers 27 and 29 by the microcomputer 20 so that the disk 1 is rotationally driven by the CLV method. Then, the process returns to step S3, and thereafter, similar processing is repeated.

At this point, as shown in FIG. 4, when the disk 1 is rotationally driven at 16× speed by the CLV method in the outer region from the limit radius X, the ratio (MIN) of the frequency-dividing ratio M to N may be set at 16. However, when the disk 1 is rotationally driven by the CAV method in the inner region from the limit radius X, the ratio of the frequency-dividing ratio M to N may be set, for example, as described below.

That is, the ratio of the frequency-dividing ratio M to N is determined by how many times of speed reproduction is performed, and how many times of speed reproduction is determined by a linear velocity of how many times of speed reproduction is performed at 1× speed. In the CAV method, since the rotational velocity is known (in the case of FIG. 4, as described above, 4,151.9 rpm), if the radius (the distance from the center of the rotation to the reproduction position) of the reproduction position is known, it is possible to determine the linear velocity at that reproduction position.

Meanwhile, the radius of the reproduction position can be determined on the basis of the subcode time; and therefore, the linear velocity at a certain reproduction position for causing the disk 1 to be rotationally driven at a predetermined rotational velocity can be determined on the basis of the subcode time.

That is, if, for example, the subcode time is denoted as t, the linear velocity to be determined as v, the radius of the track of the innermost region as D, the number of tracks from the innermost region to the reproduction position as n, and the track pitch as δ, performance of an approximation similar to that in the case of equation (2) causes the following equation to be satisfied:

$$t=(2\pi/v)(nD+(2n^2\delta/2) \tag{15}$$

Further, if the radius of the reproduction position when the subcode time is t is denoted as r, equation r=D+nδ is satisfied; therefore, when n is eliminated from equation (15) using this relation, the following is obtained:

$$t=(\pi/\delta v))(r^2-D^2) \tag{16}$$

Therefore, the radius r of the reproduction position when the subcode time is t can be determined based on the following equation:

$$r=((1/\pi)\delta v+D^2)^{1/2} \tag{17}$$

On the other hand, if the rotational velocity in the CAV method is denoted as φ, the linear velocity v at the position of the radius r can be determined based on the following equation:

$$v = 2\pi r \phi \qquad (18)$$

By eliminating the radius r from equations (17) and (18), it is possible to determine the linear velocity v for causing the rotational velocity of the disk 1 at the position of the reproduction position at which the reproduction time t can be obtained to be φ on the basis of the reproduction time t. The microcomputer 20, in step S5, sets the ratio of the frequency-dividing ratios M and N in accordance with the linear velocity v determined in this way based on th e reproduction time t.

At this point, the linear velocity v may be determined on the basis of equations (17) and (18) each time the reproduction time t is obtained. However, it is also possible to perform such calculations beforehand, and a table which describes a corresponding relationship between the reproduction time t and the linear velocity v is stored in the microcomputer 20. In this case, it becomes possible to obtain the linear velocity v instantly on the basis of the reproduction time t.

The mechanical-system-limit line and the signal-processing-system-limit line shown in FIGS. 4 and 5 are examples. This mechanical system limit line or signal processing system limit line is determined by the spindle motor 2 or the DSP 10, respectively. Therefore, it is possible to cause the disk drive to recognize the limit line beforehand, and the microcomputer 20 sets the rotational velocity or the linear velocity when the disk 1 is rotationally driven by the CAV or CLV method on the basis of the mechanical-system-limit line or the signal-processing-system-limit line, respectively.

Further, the limit radius X is the intersection point of the mechanical-system-limit line and the signal-processing-system-limit line and can be determined on the basis of these limit lines. Therefore, the subcode time t at the limit radius X can also be determined beforehand on the basis of these limit lines by the microcomputer 20.

However, the subcode time t at the limit radius X, described in FIGS. 4 and 5, is a value in the case where the standard of the disk 1 is such as that described in FIG. 1. Therefore, for a disk which does not conform to this standard, the subcode time t at the limit radius X also does not coincide with the above-described value. However, the standard described in FIG. 1 is a general standard for audio CD, CD-ROM and the like. Unless a disk which deviates from this standard appears, no particular problems arise even if the subcode time t at the limit radius X is determined based on the standard described in FIG. 1.

Further, in FIG. 10, although a check is made to determine if the reproduction position is in the inner region side or the outer region side defined by the limit radius X on the basis of the subcode time t, in addition to this, the reproduction position may be determined, for example, in the following way. That is, in the case where, for example, the mechanical-system-limit line and the signal-processing-system-limit line of the disk drive are such as those shown in FIG. 4, the radius at which the linear velocity becomes a velocity corresponding to a 16× speed when the disk 1 is rotationally driven by the CAV method becomes the limit radius X. Therefore, the following is possible in that the microcomputer 20 is made to receive a linear velocity from the velocity detector 32 in step S3, and when the linear velocity reaches a velocity corresponding to a 16× speed, assuming that the reproduction position is at the position of the limit radius X, the method of rotationally driving the disk 1 is switched between the CAV and CLV methods.

Figure 11:
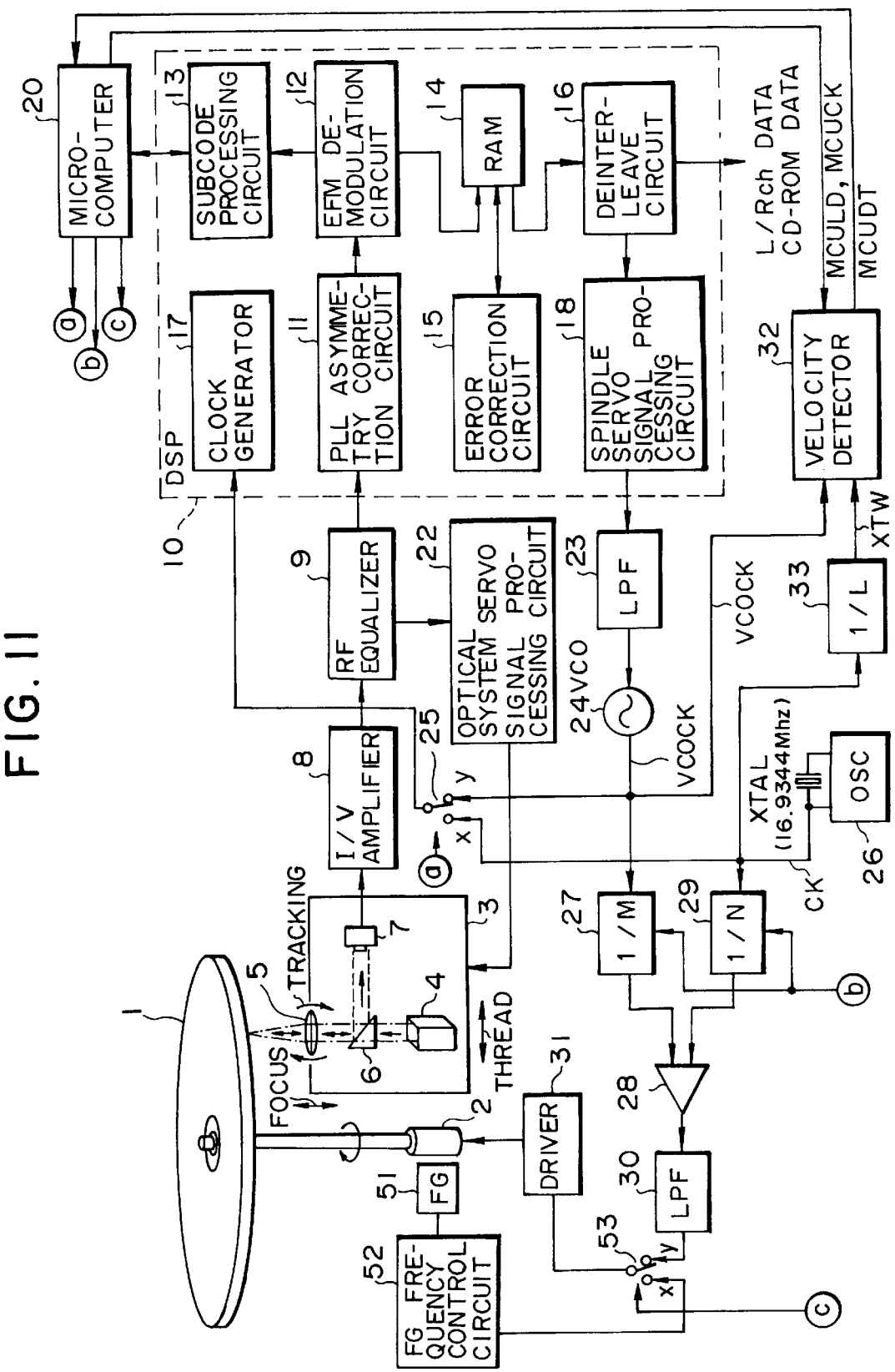
FIG. 11 is a block diagram illustrating the construction of a second embodiment of the disk drive for rotationally driving the disk 1 by the multi-driving method according to the present invention.

Next, FIG. 11 shows an example of the construction of a disk drive according to the present invention. Components in FIG. 11 which correspond to components in FIG. 7 are given the same reference numerals. That is, this disk drive is constructed similar to the disk drive of FIG. 7 except that a frequency generator (FG) 51, an FG frequency control circuit 52, and a switch 53 are newly provided.

The FG 51 generates a signal (FG pulse) corresponding to the rotational velocity of the spindle motor 2 and supplies it to the FG frequency control circuit 52. The FG frequency control circuit 52 recognizes the rotational velocity of the spindle motor 2 on the basis of the output of the FG 51, generates a drive signal for rotationally driving the spindle motor 2 so that the rotational velocity becomes along the mechanical-system-limit line, and outputs it to terminal x of the switch 53. The switch 53 selects either one of terminal x or y under control of the microcomputer 20. An output of the LPF 30 is supplied to terminal y of the switch 53.

In the disk drive constructed as described above, control is effected by the microcomputer 20 so that when the reproduction position is within the area from the innermost region to the limit radius X, the switch 53 selects the terminal x side. Therefore, in this case, a drive signal such that the rotational velocity becomes along the mechanical-system-limit line is supplied to the driver 31 from the FG frequency control circuit 52 via the switch 53. As a result, the disk 1 is rotationally driven by the CAV method in accordance with the mechanical-system-limit line.

On the other hand, when the reproduction position is within the area from the limit radius X to the outermost region, control is effected by the microcomputer 20 so that the switch 53 selects the terminal y side. Thereafter, in the microcomputer 20, control similar to that in the case in FIG. 7 is performed, and as a result, the disk 1 is rotationally driven by the CLV method in accordance with the signal-processing-system-limit line.

Figure 12:
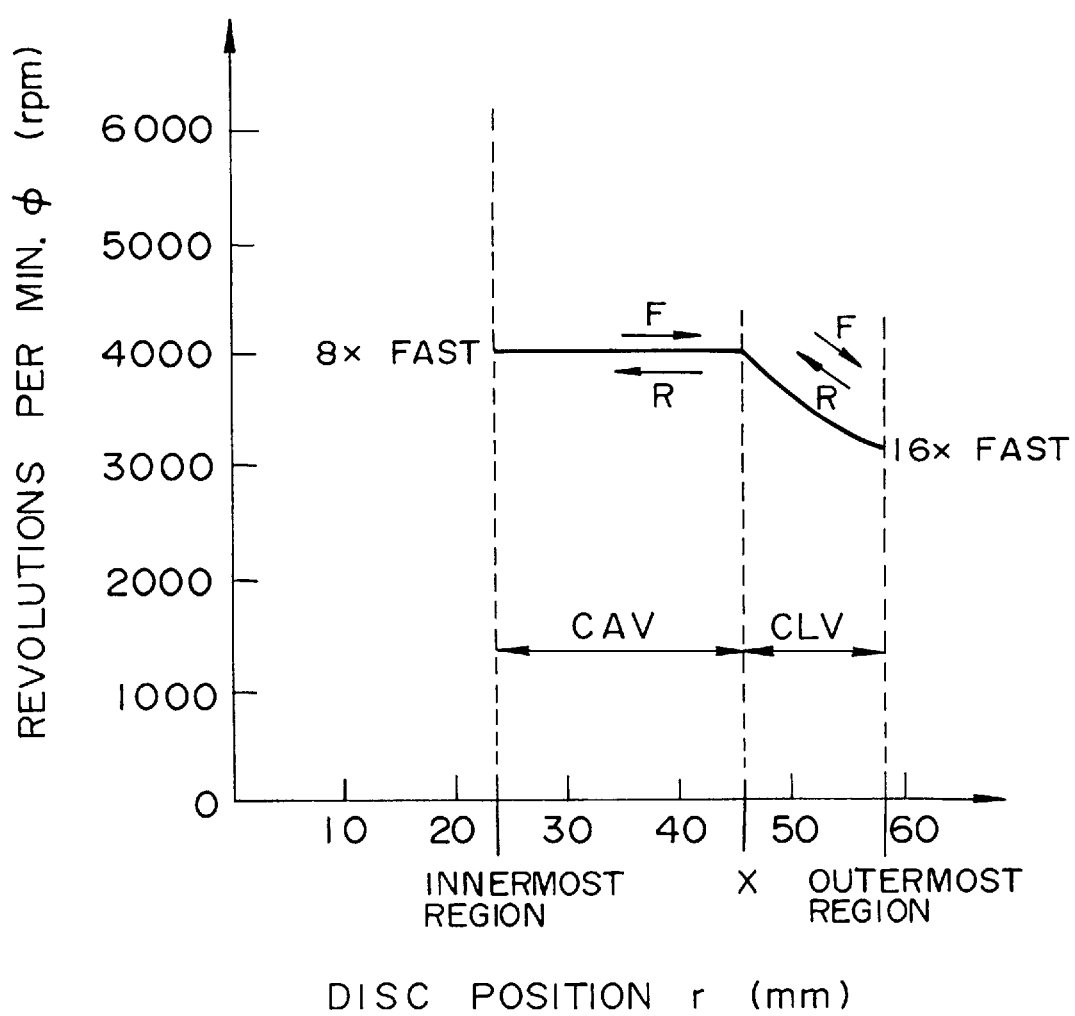
FIG. 12 shows a method of controlling a spindle motor 2 during a traverse when the multi-driving method is used.

Next, referring to FIG. 12, a description will be given of a method of controlling the spindle motor 2 during a traverse in the case where a multi-driving method is used. In FIG. 12, the horizontal axis indicates the distance (radius) from the center of the disk 1, and the vertical axis indicates the rotational velocity (the same applies to FIGS. 2 to 5 described above). Also, FIG. 12 shows the relationship between the reproduction position (the distance from the center of the disk 1) and the rotational velocity of the disk 1 when the mechanical-system-limit line and the signal-processing-system-limit line are such as those shown in FIG. 4.

First, within the area from the innermost region to the limit radius X, since, as described above, the disk 1 is rotationally driven by the CAV method, its rotational velocity is always fixed. Therefore, when a traverse is performed within this area, in any of the traverses in the direction (F) from the inner region to the outer region and in the direction (R) from the outer region to the inner region, the spindle motor 2 may be controlled so as to supply to the disk 1 an acceleration for returning the rotational velocity which is decreased during the traverse to its original rotational velocity. Therefore, in this case, it is possible to instantly start reproducing data after the traverse, and further, a large amount of electric power is not consumed due to the traverse.

Next, within the area from the limit radius X to the outermost region, since, as described above, the disk 1 is rotationally driven by the CLV method, its linear velocity is always fixed; however, its rotational velocity decreases the further toward the outermost region the reproduction position is located. Therefore, when a traverse is performed within this area, it is necessary to apply to the disk 1 an acceleration or deceleration corresponding to the difference in the rotational velocities at the reproduction positions before and after the traverse.

That is, when a traverse is performed in the direction (F) from the inner region to the outer region, the rotational velocity at the position after the traverse must be decreased to less than the rotational velocity at the position before the traverse. Therefore, it is necessary to control the spindle motor 2 so as to apply a deceleration corresponding to the rotational velocity which must be decreased.

Further, in the case where a traverse is performed in the direction (R) from the outer region to the inner region, the rotational velocity at the position after the traverse must be increased to more than the rotational velocity at the position before the traverse. Therefore, it is necessary to control the spindle motor 2 so as to apply an acceleration corresponding to the rotational velocity which must be increased.

Therefore, in the area where the disk 1 is rotationally driven by the CLV method, in comparison with the case in the CAV method, reproduction after the traverse is delayed by a time during which the above-described deceleration or acceleration is performed and further, electric power therefor is consumed. However, in the case of the multi-driving method, a maximum value of the difference in the rotational velocities of the disk 1 is small in comparison with the case, described in FIG. 2, in which the disk 1 is rotationally driven by the CLV method over the entire area thereof. As a result, it is possible to shorten the time until reproduction is started after the traverse, and further to reduce the consumption of electric power therefor in comparison with the case where the entire disk 1 is driven by the CLV method.

This fact is applied also to the case in which a traverse is performed across the area in which the disk 1 is rotationally driven by the CAV method and the area in which the disk 1 is rotationally driven by the CLV method.

In the foregoing, although a case is described in which a disk 1 is assumed to be an optical disk, such as an audio CD or CD-ROM, and the present invention is applied to a disk drive for driving the disk 1, the present invention can be applied to any disk drive which drives, in addition to an optical disk, disk-shaped recording media, such as optomagnetic disks, phase-change disks, or magnetic disks.

Although this embodiment describes a case in which data is reproduced from the disk 1, the present invention may be applied to a case in which data is recorded onto the disk 1.

Further, although in this embodiment the microcomputer 20 sets the ratio of the frequency-dividing ratio M to N each time a subcode time is obtained, in addition to this, for example, this ratio may be set each time a predetermined number of subcode times are obtained, or at every predetermined time.

Furthermore, although in this embodiment the disk 1 is divided into an inner region side and an outer region side, and the inner region side (the inner region side from the limit radius X) or the outer region side (the outer region side from the limit radius X) is rotationally driven by a CAV or CLV method, respectively, the inner region side and the outer region side may be rotationally driven by other driving methods under the condition in which the disk 1 is rotationally driven so as not to exceed the mechanical-system-limit line and the signal-processing-system-limit line.

Figure 13:
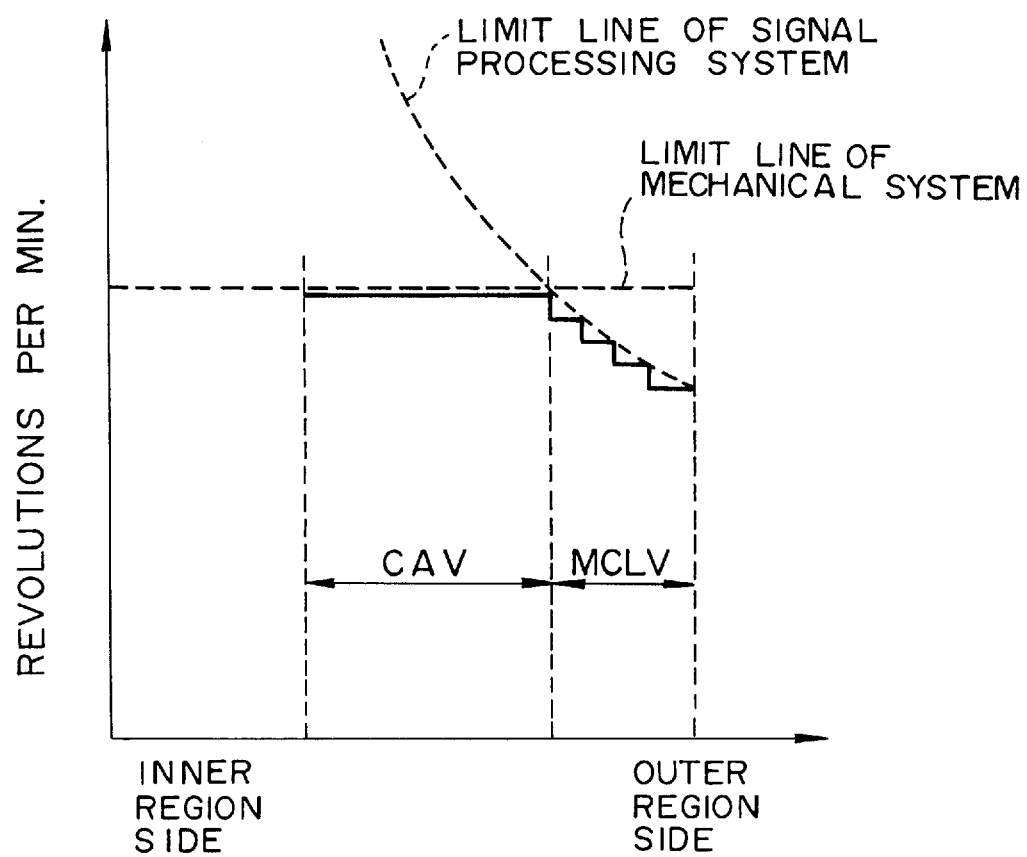
FIG. 13 shows a case in which the disk 1 is rotationally driven by the multi-driving method according to the present invention.

That is, for example, as shown in FIG. 13, the inner region side, similar to the above-described case, may be rotationally driven by the CAV method, and the outer region side may be rotationally driven by a modified CLV (MCLV) method in which the rotational velocity is changed for each predetermined area.

Figure 14:
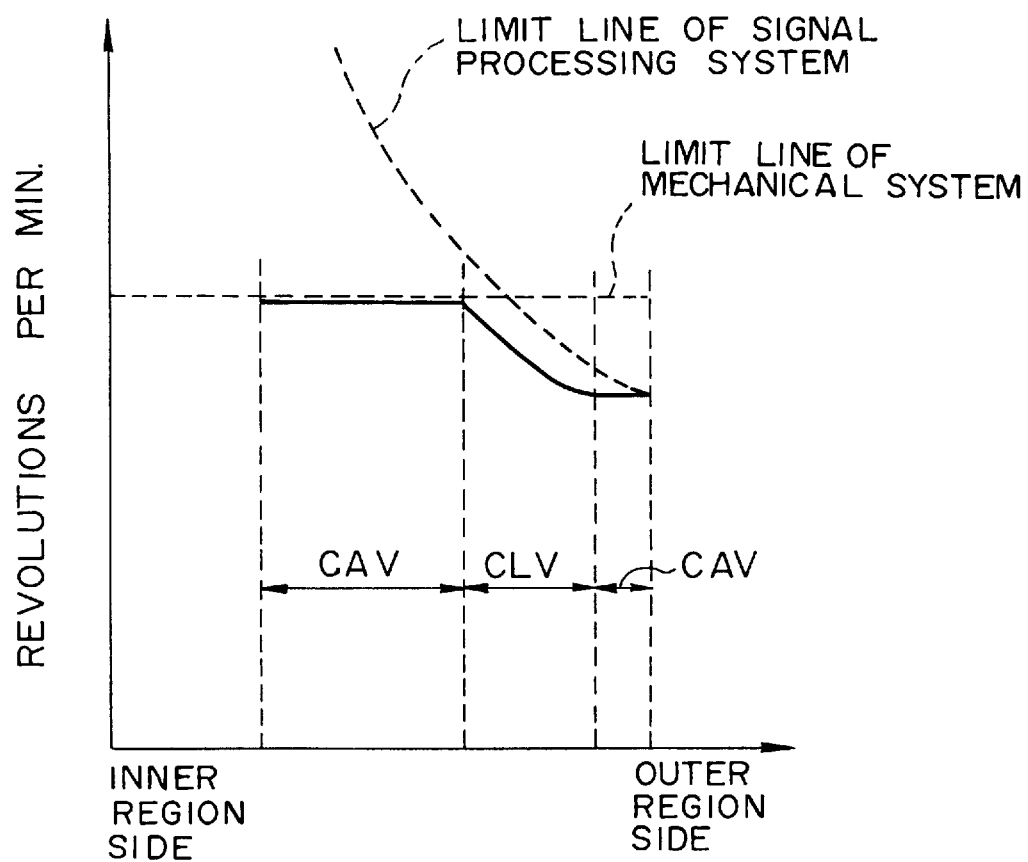
FIG. 14 shows a case in which the disk 1 is rotationally driven by the multi-driving method according to the present invention.

Further, although in this embodiment the disk 1 is divided into two regions of an inner region side and an outer region side, and the two regions are rotationally driven by the CAV and CLV methods, respectively, in addition to this, for example, as shown in FIG. 14, it is possible for the disk 1 to be divided into three regions consisting of an inner region side, an intermediate region side and an outer region side, with the three regions being rotationally driven by the CAV, CLV and CAV method, respectively. Furthermore, in this case, all of the three regions may be rotationally driven by different driving methods.

However, in any case, the disk 1 must be rotationally driven so as not to exceed the mechanical-system-limit line and the signal-processing-system-limit line. Further, maximum efficiency can be achieved when the disk 1 is rotationally driven along the mechanical-system-limit line and the signal-processing-system-limit line.

Further, although in this embodiment the reproduction position is recognized on the basis of a subcode time, in addition to this, when, for example, position information, such as sector address, has been recorded on the disk 1, the reproduction position may be recognized on the basis of the position information.

According to the disk driving apparatus and the disk driving method of the present invention, when access to a first or a second area of a recording medium is being performed, the recording medium is rotationally driven by a first or second driving method, respectively. Therefore, it becomes possible to rotationally drive the recording medium efficiently.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A disk apparatus which rotationally drives disk-shaped recording medium, comprising:

optical pick-up means;

driving means for rotationally driving said recording medium in accordance with a control signal derived from said pick-up means;

access means for accessing said recording medium; and control means for controlling said driving means so that when said access means is accessing a first or second area of said recording medium, said recording medium is rotationally driven by a first or second drive method, respectively, wherein said first area is an area from an innermost region of said recording medium to a limit radius, and said second area is an area from said limit radius to an outermost region of said recording medium, said limit radius being a radius of a maximum linear velocity which a signal processing system is capable of handling when said recording medium is rotationally driven by a constant angular velocity (CAV) method.

2. The disk apparatus according to claim 1, wherein said first or second driving method is a constant angular velocity (CAV) method or a constant linear velocity (CLV) method, respectively.

3. The disk apparatus according to claim 1, wherein time information indicating time has been recorded on said recording medium, and said control means recognizes the position at which said access means is accessing said recording medium on the basis of said time information.

4. The disk apparatus according to claim 1, further comprising: linear velocity detection means for detecting a linear velocity at the position of said recording medium that said access means is accessing, wherein said control means recognizes the position at which said access means is accessing said recording medium on the basis of said linear velocity detected by said linear velocity detection means.

5. The disk apparatus according to claim 1, further comprising:

fixed-clock generation means for generating a fixed clock which is a clock of a fixed frequency;

variable-clock generation means for generating a variable clock which is a clock of a variable frequency ;

error detection means for detecting an error with respect to said variable clock, of the linear velocity at the position at which said access means is accessing said recording medium;

fixed-clock frequency-dividing means for frequency-dividing said fixed clock; and variable-clock frequency-dividing means for frequency-dividing said variable clock, wherein said variable-clock generation means generates said variable clock of a frequency corresponding to said error output from said error detection means, said driving means rotationally drives said recording medium on the basis of the difference between the outputs of said fixed-clock frequency-dividing means and said variable-clock frequency-dividing means, and said control means causes said driving means to rotationally drive said recording medium by a first or second driving method by setting the frequency-dividing ratios of said fixed-clock frequency-dividing means and said variable-clock frequency-dividing means.

6. A disk driving method for rotationally driving a disk-shaped recording medium, comprising the steps of:

(a) recognizing an access position on said recording medium;

(b) determining whether said access position is in a first or second area of said recording medium, wherein said first area is an area from an innermost region of said recording medium to a limit radius, and said second area is an area from said limit radius to an outermost region of said recording medium, said limit radius being a radius of a maximum linear velocity which a signal processing system is capable of handling when said recording medium is rotationally driven by a constant angular velocity (CAV) method; and (c) rotationally driving said recording medium by a first or second driving method while access to said first or second area of said recording medium is being performed, respectively.

7. The disk driving method according to claim 6, wherein said step of recognizing said access position further includes reading time information indicating time recorded on said recording medium and determining the access position based on said time information.

8. The disk driving method according to claim 6, wherein said step of recognizing said access position further includes detecting a linear velocity of said recording medium at said access position and determining the access position based on said linear velocity.

9. A disk apparatus which rotationally drives disk-shaped recording medium, comprising:

optical pick-up means;

driving means for rotationally driving said recording medium in accordance with a control signal derived from said pick-up means;

access means for accessing said recording medium; and control means for controlling said driving means so that when said access means is accessing a first or second area of said recording medium, said recording medium is rotationally driven by a first or second drive method, respectively, wherein said recording medium has time information indicating time recorded thereon and the control means recognizes a position at which said access means is accessing said recording medium on the basis of said time information to determine if the access position is in the first or second area.

10. The disk apparatus according to claim 9, wherein said first or second area is an inner region side or an outer region side of said recording medium.

11. The disk apparatus according to claim 10, wherein said control means controls said driving means so that when said access means is accessing the inner region side or the outer region side of said recording medium, said recording medium is rotationally driven by a constant angular velocity (CAV) method or a constant linear velocity (CLV) method, respectively.

12. A disk apparatus which rotationally drives disk-shaped recording medium, comprising:

optical pick-up means;

driving means for rotationally driving said recording medium in accordance with a control signal derived from said pick-up means;

access means for accessing said recording medium;

linear velocity detection means for detecting a linear velocity at the position of said recording medium that said access means is accessing; and control means for controlling said driving means so that when said access means is accessing a first or second area of said recording medium, said recording medium is rotationally driven by a first or second drive method, respectively, wherein said control means recognizes the position at which said access means is accessing said recording medium on the basis of said linear velocity detected by said linear velocity detection means to determine if the access position is in the first or second area.

13. The disk apparatus according to claim 12, wherein said first or second area is an inner region side or an outer region side of said recording medium.

14. The disk apparatus according to 13, wherein said control means controls said driving means so that when said access means is accessing the inner region or the outer region side of said recording medium, said recording medium is rotationally driven by a constant angular velocity (CAV) method or a constant linear velocity (CLV) method, respectively.

* * * * *

UNITED STATES PATENT AND TRADEMARK OFFICE
CERTIFICATE OF CORRECTION

PATENT NO. : 5,883,866
DATED : March 16, 1999
INVENTOR(S) : Kazutoshi SHIMIZUME and Mamoru AKITA It is certified that error appears in the above-identified patent and that said Letters Patent is hereby corrected as shown below:

Claim 11

-- 11. The disk apparatus according to claim 10, wherein said control means controls said driving means so that when said access means is accessing the inner region or the outer region side of said recording medium, said recording medium is rotationally driven by a constant angular velocity (CAV) method or a constant linear velocity (CLV) method, respectively.

Signed and Sealed this

Twenty-first Day of September, 1999

Attest:

Q. TODD DICKINSON

*Attesting Officer*    *Acting Commissioner of Patents and Trademarks*

UNITED STATES PATENT AND TRADEMARK OFFICE
CERTIFICATE OF CORRECTION

PATENT NO. : 5,883,866
DATED : March 16, 1999
INVENTOR(S) : SHIMIZUME et al.

It is certified that error appears in the above-identified patent and that said Letters Patent is hereby corrected as shown below:

Claim 14 should read:

14. The disk apparatus according to claim 13, wherein said control means controls said driving means so that when said access means is accessing the inner region or the outer region side of said recording medium, said recording medium is rotationally driven by a constant angular velocity (CAV) method or a constant linear velocity (CLV) method, respectively.

Signed and Sealed this

Twenty-fourth Day of October, 2000

Attest:

Q. TODD DICKINSON

Attesting Officer      Director of Patents and Trademarks